(12) United States Patent
Light et al.

(10) Patent No.: US 8,464,359 B2
(45) Date of Patent: Jun. 11, 2013

(54) SYSTEM AND METHOD FOR OBTAINING A STATUS OF AN AUTHORIZATION DEVICE OVER A NETWORK

(75) Inventors: Elliott D. Light, Rockville, MD (US); Jon L. Roberts, Great Falls, VA (US)

(73) Assignee: Intellectual Ventures Fund 30, LLC, Las Vegas, NV (US)

( * ) Notice: Subject to any disclaimer, the term of this patent is extended or adjusted under 35 U.S.C. 154(b) by 1302 days.

(21) Appl. No.: 11/280,506

(22) Filed: Nov. 16, 2005

(65) Prior Publication Data

US 2006/0078101 A1 Apr. 13, 2006

Related U.S. Application Data

(63) Continuation-in-part of application No. 11/123,490, filed on May 6, 2005, now Pat. No. 7,280,642, which is a continuation-in-part of application No. 09/759,107, filed on Jan. 12, 2001, now Pat. No. 7,088,802, which is a continuation-in-part of application No. 08/963,373, filed on Oct. 20, 1997, now Pat. No. 6,175,616, and a continuation-in-part of application No. 09/265,656, filed on Mar. 2, 1999, now Pat. No. 6,483,900.

(51) Int. Cl.
*H04L 29/06* (2006.01)

(52) U.S. Cl.
USPC ................. 726/28; 726/6; 726/27

(58) Field of Classification Search
USPC .................................. 726/9, 27, 28
See application file for complete search history.

(56) References Cited

U.S. PATENT DOCUMENTS

| | | | |
|---|---|---|---|
| 3,989,899 A | 11/1976 | Norwich | |
| 4,166,929 A | 9/1979 | Sheinbein | |
| 4,335,682 A | 6/1982 | Gonda et al. | |
| 4,559,416 A | 12/1985 | Theis et al. | |
| 4,675,656 A | 6/1987 | Narcisse | |
| 4,734,931 A | 3/1988 | Bourg et al. | |
| 4,759,055 A | 7/1988 | Okumura et al. | |
| 4,792,796 A | 12/1988 | Bradshaw et al. | |
| 4,918,425 A | 4/1990 | Greenberg et al. | |
| 4,969,182 A | 11/1990 | Ohtsubo et al. | |

(Continued)

FOREIGN PATENT DOCUMENTS

| EP | 1536306 A1 * | 1/2005 |
|---|---|---|
| EP | 1536306 A1 * | 6/2005 |

OTHER PUBLICATIONS

"They're Here: Portable E-Mail and Voice Mail," PC Week, pp. 55, Feb. 12, 1990.

(Continued)

*Primary Examiner* — Yin-Chen Shaw
*Assistant Examiner* — James Turchen
(74) *Attorney, Agent, or Firm* — Schwabe, Williamson & Wyatt, P.C.

(57) ABSTRACT

A system and method for determining the status of an authorization device over a network. Output signals indicative of the status of the authorization device are stored in a status file. An authorization datastore accesses the status file over the first network and obtains the status of the authorization device. A determination is made from the user identifier if the user is authorized to use the controlled device. Permission is granted to the user to use the controlled device if the user is determined to be authorized to use the controlled device.

12 Claims, 8 Drawing Sheets

U.S. PATENT DOCUMENTS

| | | | |
|---|---|---|---|
| 5,023,868 | A | 6/1991 | Davidson et al. |
| 5,054,428 | A | 10/1991 | Farkus |
| 5,062,147 | A | 10/1991 | Pickett et al. |
| 5,223,815 | A | 6/1993 | Rosenthal et al. |
| 5,353,744 | A | 10/1994 | Custer |
| 5,381,129 | A | 1/1995 | Boardman |
| 5,418,835 | A | 5/1995 | Frohman et al. |
| 5,425,091 | A | 6/1995 | Josephs |
| 5,425,330 | A | 6/1995 | Touchton et al. |
| 5,446,553 | A | 8/1995 | Grube |
| 5,461,365 | A | 10/1995 | Schlager et al. |
| 5,461,372 | A | 10/1995 | Busak et al. |
| 5,465,687 | A | 11/1995 | Custer |
| 5,477,210 | A | 12/1995 | Belcher |
| 5,500,893 | A | 3/1996 | Onosaka |
| 5,530,740 | A | 6/1996 | Irribarren et al. |
| 5,553,469 | A | 9/1996 | Seidel |
| 5,605,116 | A | 2/1997 | Kim et al. |
| 5,608,786 | A | 3/1997 | Gordon |
| 5,642,690 | A | 7/1997 | Calabrese et al. |
| 5,646,593 | A | 7/1997 | Hughes et al. |
| 5,647,002 | A | 7/1997 | Brunson |
| 5,689,235 | A | 11/1997 | Sugimoto et al. |
| 5,742,668 | A | 4/1998 | Pepe et al. |
| 5,781,102 | A | 7/1998 | Huang |
| 5,794,143 | A | 8/1998 | McCarthy et al. |
| 5,796,394 | A | 8/1998 | Wicks et al. |
| 5,857,433 | A | 1/1999 | Files |
| 5,868,100 | A | 2/1999 | Marsch |
| 5,923,731 | A | 7/1999 | McClure |
| 5,928,325 | A | 7/1999 | Shaughnessy et al. |
| 5,939,988 | A | 8/1999 | Neyhart |
| 5,943,399 | A | 8/1999 | Bannister et al. |
| 5,977,913 | A | 11/1999 | Christ |
| 6,011,471 | A | 1/2000 | Huang |
| 6,029,047 | A | 2/2000 | Ishida et al. |
| 6,038,666 | A * | 3/2000 | Hsu et al. ............. 713/186 |
| 6,075,443 | A | 6/2000 | Schepps et al. |
| 6,078,649 | A | 6/2000 | Small et al. |
| 6,081,546 | A | 6/2000 | Williamson et al. |
| 6,125,176 | A | 9/2000 | Foladare et al. |
| 6,130,933 | A | 10/2000 | Miloslavsky |
| 6,154,525 | A | 11/2000 | Formosa |
| 6,157,943 | A | 12/2000 | Meyer |
| 6,166,635 | A | 12/2000 | Huang |
| 6,169,484 | B1 | 1/2001 | Schuchman et al. |
| 6,175,616 | B1 | 1/2001 | Light et al. |
| 6,189,105 | B1 * | 2/2001 | Lopes ..................... 726/20 |
| 6,208,725 | B1 | 3/2001 | Davies |
| 6,298,120 | B1 | 10/2001 | Civanlar et al. |
| 6,366,575 | B1 | 4/2002 | Barkan et al. |
| 6,385,510 | B1 | 5/2002 | Hoog et al. |
| 6,404,764 | B1 | 6/2002 | Jones et al. |
| 6,405,132 | B1 | 6/2002 | Breed et al. |
| 6,412,813 | B1 | 7/2002 | Breed et al. |
| 6,438,217 | B1 | 8/2002 | Huna |
| 6,483,900 | B1 | 11/2002 | Light et al. |
| 6,490,680 | B1 * | 12/2002 | Scheidt et al. ............ 713/166 |
| 6,529,131 | B2 | 3/2003 | Wentworth |
| 6,545,589 | B1 | 4/2003 | Fuller |
| 6,577,238 | B1 | 6/2003 | Whitesmith et al. |
| 6,600,422 | B2 | 7/2003 | Barry et al. |
| 6,614,884 | B2 | 9/2003 | Jang |
| 6,671,355 | B1 | 12/2003 | Spielman et al. |
| 6,686,881 | B1 | 2/2004 | Lu et al. |
| 6,687,609 | B2 | 2/2004 | Hsiao et al. |
| 6,720,920 | B2 | 4/2004 | Breed et al. |
| 6,807,423 | B1 | 10/2004 | Armstrong et al. |
| 6,820,897 | B2 | 11/2004 | Breed et al. |
| 6,825,762 | B2 | 11/2004 | Giacopelli et al. |
| 6,837,427 | B2 | 1/2005 | Overhultz et al. |
| 6,861,944 | B1 * | 3/2005 | Hoepelman ................ 340/5.1 |
| 6,917,291 | B2 | 7/2005 | Allen |
| 6,989,745 | B1 | 1/2006 | Milinusic et al. |
| 7,006,833 | B1 | 2/2006 | Contractor |
| 7,031,695 | B2 * | 4/2006 | Aono et al. ............... 455/411 |
| 7,034,663 | B2 | 4/2006 | Mansfield |
| 7,053,765 | B1 | 5/2006 | Clark |
| 7,061,376 | B2 * | 6/2006 | Wang et al. .............. 340/539.13 |
| 7,069,444 | B2 * | 6/2006 | Lowensohn et al. .......... 713/185 |
| 7,092,794 | B1 | 8/2006 | Hill et al. |
| 7,120,238 | B1 | 10/2006 | Bednarz et al. |
| 7,178,034 | B2 * | 2/2007 | Cihula et al. ............... 713/186 |
| 7,301,451 | B2 | 11/2007 | Hastings |
| 7,312,759 | B2 | 12/2007 | Kinney et al. |
| 7,322,043 | B2 * | 1/2008 | Letsinger ................... 726/19 |
| 7,356,137 | B1 | 4/2008 | Burg et al. |
| 7,441,108 | B2 | 10/2008 | Fisher et al. |
| 7,502,615 | B2 * | 3/2009 | Wilhoite et al. ............ 455/442 |
| 7,516,325 | B2 * | 4/2009 | Willey ....................... 713/169 |
| 7,894,825 | B2 | 2/2011 | Wallace et al. |
| 7,941,534 | B2 * | 5/2011 | de la Huerga .............. 709/225 |
| 2002/0198632 | A1 | 12/2002 | Breed et al. |
| 2003/0035514 | A1 | 2/2003 | Jang |
| 2003/0074575 | A1 * | 4/2003 | Hoberock et al. ........... 713/200 |
| 2003/0110371 | A1 | 6/2003 | Yang et al. |
| 2003/0142794 | A1 | 7/2003 | Giacopelli et al. |
| 2003/0233189 | A1 | 12/2003 | Hsiao et al. |
| 2003/0236991 | A1 * | 12/2003 | Letsinger ................... 713/200 |
| 2004/0180646 | A1 | 9/2004 | Donley et al. |
| 2004/0204215 | A1 | 10/2004 | Meehan et al. |
| 2004/0257219 | A1 | 12/2004 | Spiess et al. |
| 2005/0125102 | A1 | 6/2005 | Nichols et al. |
| 2005/0128057 | A1 | 6/2005 | Mansfield et al. |
| 2005/0151640 | A1 | 7/2005 | Hastings |
| 2005/0198063 | A1 | 9/2005 | Thomas et al. |
| 2005/0231375 | A1 | 10/2005 | Kingston |
| 2005/0240918 | A1 | 10/2005 | Shlomai |
| 2005/0257055 | A1 * | 11/2005 | Anderson .................. 713/170 |
| 2006/0023848 | A1 | 2/2006 | Mohler et al. |
| 2006/0034255 | A1 | 2/2006 | Benning et al. |
| 2006/0064603 | A1 * | 3/2006 | Relan et al. ................ 713/193 |
| 2006/0068752 | A1 | 3/2006 | Lin et al. |
| 2006/0093118 | A1 | 5/2006 | Agrawal et al. |
| 2006/0103520 | A1 | 5/2006 | Clark |
| 2006/0116127 | A1 * | 6/2006 | Wilhoite et al. ............ 455/442 |
| 2006/0144929 | A1 | 7/2006 | McGee |
| 2006/0220830 | A1 | 10/2006 | Bennett et al. |
| 2006/0239250 | A1 | 10/2006 | Elliot et al. |
| 2006/0240771 | A1 | 10/2006 | Graves et al. |
| 2007/0206729 | A1 | 9/2007 | Baum et al. |
| 2007/0240155 | A1 | 10/2007 | Shlomai |

OTHER PUBLICATIONS

Notice of Allowance, issued in U.S. Appl. No. 09/759,107, mailed May 11, 2006.

Office Action, issued in U.S. Appl. No. 09/759,107, mailed Feb. 10, 2006.

Office Action, issued in U.S. Appl. No. 09/759,107, mailed Sep. 22, 2005.

Office Action, issued in U.S. Appl. No. 09/759,107, mailed Apr. 4, 2005.

Office Action, issued in U.S. Appl. No. 09/759,107, mailed Jun. 8, 2004.

Office Action, issued in U.S. Appl. No. 09/759,107, mailed Mar. 24, 2004.

Notice of Allowance, issued in U.S. Appl. No. 11/280,497, mailed Oct. 24, 2008.

Final Office Action, issued in U.S. Appl. No. 11/280,497, mailed Jul. 11, 2008.

Office Action, issued in U.S. Appl. No. 11/280,497, mailed Mar. 6, 2008.

Office Action, issued in U.S. Appl. No. 11/182,674, mailed Oct. 17, 2006.

Notice of Allowance, issued in U.S. Appl. No. 11/182,674, mailed Oct. 26, 2007.

Office Action, issued in U.S. Appl. No. 11/182,674, mailed Sep. 18, 2007.

Notice of Allowance, issued in U.S. Appl. No. 11/182,674, mailed Apr. 20, 2007.

Office Action, issued in U.S. Appl. No. 11/182,674, mailed Nov. 27, 2006.

Notice of Allowance, issued in U.S. Appl. No. 11/123,490, mailed Jun. 4, 2007.

Notice of Allowance, issued in U.S. Appl. No. 11/344,750, mailed Aug. 21, 2008.
Notice of Allowance, issued in U.S. Appl. No. 11/344,750, mailed Apr. 29, 2008.
Office Action, issued in U.S. Appl. No. 11/413,887, mailed Nov. 1, 2006.
Final Office Action, issued in U.S. Appl. No. 11/413,887, mailed Nov. 29, 2006.
Office Action, issued in U.S. Appl. No. 11/413,887, mailed Jun. 13, 2007.
Final Office Action, issued in U.S. Appl. No. 11/413,887, mailed Oct. 4, 2007.
Office Action, issued in U.S. Appl. No. 11/413,887, mailed Apr. 2, 2008.
Office Action, issued in U.S. Appl. No. 11/413,887, mailed Sep. 10, 2008.
Office Action, issued in U.S. Appl. No. 11/413,887, mailed Dec. 18, 2008.
Office Action, issued in U.S. Appl. No. 11/413,887, mailed Mar. 31, 2009.
Office Action, issued in U.S. Appl. No. 11/413,887, mailed Jun. 2, 2009.
Final Office Action, issued in U.S. Appl. No. 11/413,887, mailed Oct. 20, 2009.
Advisory Action, issued in U.S. Appl. No. 11/413,887, mailed Feb. 8, 2007.
Advisory Action, issued in U.S. Appl. No. 11/413,887, mailed Dec. 23, 2009.
Advisory Action, issued in U.S. Appl. No. 11/413,887, mailed Nov. 17, 2008.
Notice of Allowance, issued in U.S. Appl. No. 11/413,887, mailed Jan. 28, 2010.
Office Action, issued in U.S. Appl. No. 11/413,888, mailed Oct. 30, 2006.
Final Office Action, issued in U.S. Appl. No. 11/413,888, mailed Nov. 27, 2006.
Notice of Allowance, issued in U.S. Appl. No. 11/413,888, mailed Apr. 19, 2007.
Office Action, issued in U.S. Appl. No. 11/413,888, mailed Aug. 30, 2007.
Final Office Action, issued in U.S. Appl. No. 11/413,888, mailed Dec. 13, 2007.
Notice of Allowance, issued in U.S. Appl. No. 11/413,888, mailed Mar. 19, 2008.
Office Action, issued in U.S. Appl. No. 11/413,888, mailed Jun. 24, 2008.
Final Office Action, issued in U.S. Appl. No. 11/413,888, mailed Aug. 25, 2008.
Notice of Allowance, issued in U.S. Appl. No. 11/413,888, mailed Dec. 10, 2008.
Office Action, issued in U.S. Appl. No. 09/265,656, mailed Mar. 29, 2002.
Notice of Allowance, issued in U.S. Appl. No. 09/265,656, mailed Aug. 26, 2002.
Office Action, issued in U.S. Appl. No. 08/963,373, mailed Oct. 6, 1999.
Final Office Action, issued in U.S. Appl. No. 08/963,373, mailed May 23, 2000.
Notice of Allowance, issued in U.S. Appl. No. 08/963,373, mailed Aug. 11, 2000.
Office Action, issued in U.S. Appl. No. 12/031,989, mailed Dec. 10, 2010, 7 pages.
Notice of Allowance, issued in U.S. Appl. No. 11/517,663, mailed Nov. 17, 2009.
Office Action, issued in U.S. Appl. No. 11/517,663, mailed Jun. 15, 2009.
Final Office Action, issued in U.S. Appl. No. 11/517,663, mailed Mar. 30, 2009.
Office Action, issued in U.S. Appl. No. 11/517,663, mailed Dec. 16, 2008.
Office Action, issued in U.S. Appl. No. 11/517,663, mailed Dec. 15, 2008.
Final Office Action, issued in U.S. Appl. No. 11/517,663, mailed Jul. 2, 2008.
Office Action, issued in U.S. Appl. No. 11/517,663, mailed Dec. 10, 2007.
Notice of Allowance, issued in U.S. Appl. No. 12/031,989, mailed Mar. 9, 2011, 7 pages.
Rob Harrill, "A watch that's smarter than you?", http://www.eurekalert.org/pub_releases/2004-10/uow-awt100604.php, Oct. 6, 2004.
Suresafe Technology, Inc. Product Description, http://www.suresafe.com, Accessed Feb. 8, 2005 & Dec. 13, 2004.
TrackIT Corp. Product Description; "Mobile Security Goes High Tech", http://www.trackitcorp.com ; 1997, 1998.

* cited by examiner

SYSTEM AND METHOD FOR OBTAINING A STATUS OF AN AUTHORIZATION DEVICE OVER A NETWORK

CROSS REFERENCE TO RELATED APPLICATIONS

This application is a continuation in part of application Ser. No. 11/123,490 filed May 6, 2005 now U.S. Pat. No. 7,280, 642, which is a continuation in part of application Ser. No. 09/759,107 filed Jan. 12, 2001 now U.S. Pat. No. 7,088,802, which is a continuation in part of application Ser. No. 08/963, 373, filed Oct. 20, 1997, now U.S. Pat. No. 6,175,616 and a continuation in part of application Ser. No. 09/265,656, filed Mar. 2, 1999, now U.S. Pat. No. 6,483,900. The Ser. Nos. 11/123,490, 09/759,107, 09/265,656, and 08/963,373 applications and the U.S. Pat. Nos. 6,175,616 and 6,483,900 patents are incorporated herein by reference, in the entirety, for all purposes.

BACKGROUND

This invention relates generally to electronically determining the status of a device over a network. More specifically, the present invention provides a method and apparatus for reporting the status of a device to a file that is accessible from a obtaining the reported status remotely.

The Ser. Nos. 08/963,373, 09/265,656, 09/759,107, and 11/123,490 applications (collectively, the "Status Applications") comprise embodiments relating to monitoring the status of a receiving device, a telephone, a device, and alarm components within a structure.

The Ser. No. 08/963,373 application, as issued as U.S. Pat. No. 6,175,616, discloses a system for obtaining telephone status over a network comprising a calling party computer, a network to which the calling party computer is connected, a plurality of telephones, a telephone status monitor connected to the plurality of telephones for monitoring a telephone status of the plurality of telephones, and a telephone status file connected to the telephone status monitor for receiving the telephone status from the plurality of telephones. The telephone status file is connected to and accessible via the network. The telephone status is a consumer option selected from the group consisting of: number of rings to voicemail and call forwarding.

In another embodiment disclosed in U.S. Pat. No. 6,175, 616, the system further comprises a called party processor connected to the network. A voice mail converter is connected to the called party processor for converting an alpha numeric message to a voice mail message. The converter is also connected to a called party telephone for allowing a called party to access the voice mail message. The calling party processor can create an alphanumeric message to be sent to the called party processor over the network for subsequent conversion into voice mail by the voice mail converter.

In yet another embodiment disclosed in U.S. Pat. No. 6,175,616, a calling party inputs a called party's telephone number via a calling party processor that is monitoring the telephone of the called party to determine the telephone status of the called party. The status of the called party's telephone is made available in a file. The called party telephone status file is accessed over a network. The calling party creates an alpha numeric message and sends the alpha numeric message over the network to a called party processor. The called party processor receives the alphanumeric message. The received alphanumeric message is converted to voice mail via a voice mail converter. The called party accesses voice mail to receive the converted alpha numeric message.

The Ser. No. 09/265,656 application, as issued as U.S. Pat. No. 6,483,900, discloses a system for obtaining equipment status over a network comprising equipment adapted to provide output signals indicative of the status of the equipment, a first network connected to the equipment for receiving the signals from the equipment, a status file connected to the first network for receiving the output signals from the equipment over the first network, a second network connected to the status file, and a processor connected to the second network. The processor comprises instructions for accessing the status file over the second network, and for displaying the status of the equipment to a user of the processor.

In another embodiment disclosed in U.S. Pat. No. 6,483, 900, the equipment comprises a plurality of telephones. In this embodiment, the signals indicative of the status of the equipment comprises off-hook signals from the plurality of telephones if any of the plurality of telephones are off-hook. The status file comprises the off-hook status of the plurality of telephones if any of the plurality of telephones is off hook. By way of illustration and not as a limitation, the first network may be a public switched telephone network or a cable network. By way of illustration and not as a limitation, the second network may be a cable network or the Internet.

In yet another embodiment disclosed in U.S. Pat. No. 6,483,900, a system for obtaining equipment status over a network further comprises at least one thermostat. In this embodiment, the signals indicative of the status of the equipment comprises temperature. In another embodiment, the status file comprises temperature signaled by at least one thermostat.

In still another embodiment disclosed in U.S. Pat. No. 6,483,900, a system for determining telephone status over a network comprises a plurality of telephones, a cable network to which the plurality of telephones are connected, a switch connected to the cable network for placing telephone calls over a public switched telephone network (PTSN), the switch comprising instructions for determining and transmitting telephone status, a telephone status file adapted to receive and store the telephone status from the switch, a second network connected to the telephone status file, and at least one computer connected to the network, the computer comprising instructions for accessing the telephone status file over the second network. In an embodiment, the second network is the Internet.

An embodiment disclosed in the Ser. No. 09/759,107 application is a system for communicating status of a plurality of plain old telephone system (POTS) telephones over a network to an inquiring computer. The system comprises a telephone status monitor connected so as to monitor a telephone status of the plurality of POTS telephones, and a telephone status file connected to the telephone status monitor for receiving the telephone status of the plurality of POTS telephones. The telephone status file is accessible by the inquiring computer via the network. The telephone status may comprise an on-hook and off-hook condition of the telephone and the status of consumer options for telephone service.

In another embodiment disclosed in the Ser. No. 09/759, 107 application, the system further comprises a calling party telephone and logic enabling the calling party telephone to place a telephone call to one of the plurality of POTS telephones when that one of the plurality of POTS telephones is in an on-hook status.

In yet another embodiment disclosed in the Ser. No. 09/759,107 application, the system further comprises a voice mail converter connected to receive an alpha numeric message via the network and convert the alpha numeric message into a voice mail message. The converter is further connected so as to allow a called party to access the voice mail message. The inquiring computer can create an alphanumeric message to be sent to the voice mail converter over the network for subsequent conversion into voice mail by the voice mail converter. Optionally, the system further comprises a called party processor connected to the network. The voice mail converter is connected to receive the alpha numeric message from the network via the called party processor.

Another embodiment disclosed in the Ser. No. 09/759,107 application provides a process for a calling party to determine telephone status of a called party telephone over a network. A telephone number corresponding to the called party's plain old telephone system (POTS) telephone is inputted to a telephone status monitor over the network via a calling party processor. A called party telephone status file is accessed over the network. The status of the called party's POTS telephone is made available via the called party telephone status file by the telephone status monitor. Optionally, the calling party processor dials the telephone number of the called party's POTS telephone when an on-hook status is detected to establish a telephone call between the calling party and the called party via a telephone connected to the calling party processor.

Yet another embodiment disclosed in the Ser. No. 09/759, 107 application provides a process for determining telephone status. A telephone status file is accessed over a network. The status of a plurality of plain old telephone system (POTS) telephones is monitored and that telephone status is provided to the telephone status file. The telephone status may be periodically updated. In another embodiment, accessing a telephone status over a network comprises receiving a number to be called, input by a calling party, and reviewing the telephone status of the number to be called in the telephone status file. In yet another embodiment, the process further comprises notifying a calling party by pager that a called party telephone is in an on-hook condition.

An embodiment disclosed in the Ser. No. 09/759,107 application is a system for communicating over a network comprising a voice mail converter connected to receive an alpha numeric message via the network and convert the alpha numeric message into a voice mail message. The converter is further connected so as to allow a called party to access the voice mail message. A message creation device creates an alphanumeric message to be sent to the voice mail converter over the network for subsequent conversion into voice mail by the voice mail converter. In an embodiment, the network is a wireless network and the message creation device comprises a wireless communication device. In another embodiment, the creation device comprises a telephone. In still another embodiment, the the creation device comprises a computer. In yet another embodiment, the network is a wireless network and the called party accesses the voice mail message using a wireless communication device. The wireless communication device may comprise a telephone, a computer, or a personal digital assistant having voice capability. The creation device may be telephone or computer. The called party may access the voice mail message using a telephone, a computer, or a personal digital assistant having voice capability.

An embodiment disclosed in the Ser. No. 09/759,107 application is a system for providing status of a plurality of telephones over a network to an inquiring computer. The system comprises a telephone status monitor connected so as to monitor a telephone status of the plurality of telephones and a telephone status file connected to the telephone status monitor for receiving the telephone status of the plurality of telephones. The telephone status file is accessible by the inquiring computer via the network. The telephone status is a consumer option selected from the group consisting of a number of rings to voicemail and call waiting.

Another embodiment disclosed in the Ser. No. 09/759,107 application is a system for providing telephone status over a network to a calling party computer connected to that network. The system comprises a telephone status monitor connected so as to monitor a telephone status of a telephone, a telephone status file connected to the telephone status monitor for receiving the telephone status of the telephone, the telephone status file being accessible by the calling computer via the network, and a voice mail converter connected to receive an alpha numeric message via the network and convert the alpha numeric message into a voice mail message. The voice mail converter is connected so as to allow a called party to access the voice mail message. The calling party computer can create an alphanumeric message to be sent to the voice mail converter via the network for subsequent conversion into voice mail by the voice mail converter. Optionally, the system further comprises a called party processor connected to the network. The voice mail converter is connected to receive the alpha numeric message from the network via the called party processor.

Yet another embodiment disclosed in the Ser. No. 09/759, 107 application provides a process for a calling party to determine telephone status of a called party telephone over a network. A called party's telephone number is inputted to a telephone status monitor over the network via a calling party processor. The called party telephone status file is accessed over the network. The status of the called party telephone is made available via the called party status file by the telephone status monitor. An alpha numeric message is created sending the alpha numeric message over the network to a voice mail converter for conversion into a voice mail message. The voice mail message is accessible for retrieval by the called party. In an embodiment, the alpha numeric message is received at the voice mail converter via a called party processor connected between the network and the voice mail converter.

A further embodiment disclosed in the Ser. No. 09/759,107 application provides a process for determining telephone status. A telephone status file is accessed over a network, the telephone status file representing telephone status of one or more telephones that are being monitored. Periodic updates to the telephone status file with respect to a called party telephone selected from the one or more telephones monitored for the telephone status file are reviewed. A calling party is notified by pager that the called party telephone is in an on-hook condition.

An embodiment disclosed in the Ser. No. 09/759,107 application is a system for communicating thermal status via one or more telephones over a network to an inquiring computer. The system comprises a telephone status monitor connected so as to monitor a telephone status of the one or more telephones, and a telephone status file connected to the telephone status monitor for receiving the telephone status of the one or more telephones, the telephone status file being accessible by the inquiring computer via the network. The telephone status comprises a temperature condition of a thermal system reporting to the telephone. By way of illustration and not as a limitation, the thermal system reporting a temperature condition may be selected from the group consisting of a household heating system, a household cooling system, a household central air system, a commercial heating-ventilation-air-conditioning system, a refrigerator, and a freezer.

An embodiment disclosed in the Ser. No. 09/759,107 application provides a process for a calling party to determine thermal status via a called party telephone over a network. A telephone number corresponding to the called party's telephone is inputted to a telephone status monitor over the network via a calling party processor. A called party telephone status file is accessed over the network. The telephone status of the called party's telephone is made available via the called party telephone status file by the telephone status monitor. The telephone status comprises a temperature condition of a thermal system reporting to the telephone. In an embodiment, the thermal system reporting a temperature condition is selected from the group consisting of a household heating system, a household cooling system, a household central air system, a commercial heating-ventilation-air-conditioning system, a refrigerator, and a freezer.

Another embodiment disclosed in the Ser. No. 09/759,107 application provides a process for determining temperature status via telephone. A telephone status file is accessed over a network. The temperature status corresponding to a plurality of telephones is monitored and that temperature status is provided to the telephone status file. In an embodiment, the temperature status corresponding to each of the plurality of telephones comprises a temperature condition reported by a thermal system, wherein the thermal system is selected from the group consisting of a household heating system, a household cooling system, a household central air system, a commercial heating-ventilation-air-conditioning system, a refrigerator, and a freezer.

Yet another embodiment disclosed in the Ser. No. 09/759,107 application provides a system for communicating status of a plurality of telephones over a network to a videophone. The system comprises a telephone status monitor connected so as to monitor a telephone status of the plurality of telephones and a telephone status file connected to the telephone status monitor for receiving the telephone status of the plurality of telephones. The telephone status file is accessible by the videophone via the network.

Still another embodiment disclosed in the Ser. No. 09/759,107 application provides a process for a calling party to determine telephone status of a called party telephone over a network. A telephone number corresponding to the called party's telephone is inputted to a telephone status monitor over the network via a videophone. A called party telephone status file is accessed with the videophone over the network. The status of the called party's telephone is made available via the called party telephone status file by the telephone status monitor.

Another embodiment disclosed in the Ser. No. 09/759,107 application provides process for determining telephone status comprising. A telephone status file is accessed over a network using a videophone. The status of a plurality of telephones is monitored and that telephone status is provided to the telephone status file for viewing via the videophone.

Yet another embodiment disclosed in the Ser. No. 09/759,107 application provides a system for communicating status of a plurality of wireless telecommunication devices over a network to an inquiring computer. The system comprises a telephone status monitor connected so as to monitor a telephone status of the plurality of wireless telecommunication devices, and a telephone status file connected to the telephone status monitor for receiving the telephone status of the plurality of wireless telecommunication devices. The telephone status file is accessible by the inquiring computer via the network. Optionally, system further comprises a voice mail converter connected to receive an alpha numeric message via the network and convert the alpha numeric message into a voice mail message. The voice mail converter is further connected so as to allow a called party to access the voice mail message via one or more of the plurality of wireless telecommunication devices. The inquiring computer can create an alphanumeric message to be sent to the voice mail converter via the network for subsequent conversion into voice mail by the voice mail converter.

Still another embodiment disclosed in the Ser. No. 09/759,107 application provides a process for a calling party to determine device status of a called party wireless telecommunication device over a network. A telephone number corresponding to the called party's wireless telecommunication device is inputted to a device status monitor over the network via a calling party processor. A called party device status file is accessed over a network. The status of the called party's wireless telecommunication devices is made available via the called party device status file by the device status monitor. Optionally, an alpha numeric message is created. The alpha numeric message is sent over the network to a voice mail converter for conversion into a voice mail message. The voice mail message is accessible for retrieval by the called party via the called party's wireless telecommunication device. In an embodiment, the calling party is notified by pager that the called party's wireless telecommunication device is in an on-hook condition.

An embodiment disclosed in the Ser. No. 09/759,107 application provides a process for determining wireless telecommunication device status. A device status file is accessed over a network. The status of a plurality of wireless telecommunication devices is monitored and that device status is provided to the device status file. In an embodiment, the calling party is notified by pager that the called party's wireless telecommunication device is in an on-hook condition In an embodiment disclosed in the Ser. No. 11/123,490 application, a system for obtaining status of a receiving device over a network comprises equipment adapted to provide output signals indicative of the status of the receiving device, a status file, a first network, a second network, and a sending device. The receiving device comprises an address for receiving communications. By way of illustration and not as a limitation, the receiving device may be a telephone, and wherein the signals indicative of the status of the receiving device comprises off-hook signals from the telephone if the telephone is off-hook. In an embodiment, the user address and the receiving device address are telephone numbers. However, this is not meant as a limitation. Other addressing systems may be used without departing from the scope of the present invention.

The status file is connected to the equipment and to the first network and receives the output signals from the equipment. The sending device is connected to the first network and comprises instructions for accessing the status file over the first network and for obtaining the status of the receiving device. By way of illustration and not as a limitation, the status file comprises the off-hook status of a telephone if the of telephone is off hook and the on-hook status of a telephone if the telephone is on-hook. The status comprises a user identifier of a potential user of the receiving device determined to be within a preset access distance of the receiving device.

According to embodiments disclosed in the Ser. No. 11/123,490 application, the first network is selected from the group consisting of a wired network, wireless network, a fiber network, hybrid fiber coax network, a switched network, a packet-based network, a cable network, a public switched telephone network, and the Internet. According to other embodiments of the present invention, the receiving device is selected from the group consisting of a telephone, a computing device, a digital telephone adapted to provide voice over IP, a digital telephone adapted to provide voice over a packet switched network, a personal data assistance, a cell phone, a radio phone, and a video phone.

According to embodiments disclosed in the Ser. No. 11/123,490 application, the sending device is selected from the group consisting of a telephone, a computing device, a digital telephone adapted to provide voice over IP, a digital telephone adapted to provide voice over a packet switched network, a personal data assistance, a cell phone, a radio phone, a video phone a switch, a router, a proxy server, and a PBX.

In still another embodiment disclosed in the Ser. No. 11/123,490 application, the system further comprises a second network. According to this embodiment, the sending device associates a user address with the user identifier, and routes communications addressed to the user address to the address of the receiving device via the second network.

According to embodiments disclosed in the Ser. No. 11/123,490 application, the second network is selected from the group consisting of a wired network, wireless network, a fiber network, hybrid fiber coax network, a switched network, a packet-based network, a cable network, a public switched telephone network, and the Internet.

In an embodiment disclosed in the Ser. No. 11/123,490 application, a system for obtaining status of a receiving device over a network comprises equipment that provides output signals indicative of the status of the receiving device, a datastore, a receiving device monitor, a status file, a first network, a second network, and a sending device. The receiving device comprises an address for receiving communications. By way of illustration and not as a limitation, the receiving device may be a telephone, and wherein the signals indicative of the status of the receiving device comprises off-hook signals from the telephone if the telephone is off-hook. In this embodiment, the user address and the receiving device address are telephone numbers. However, this is not meant as a limitation. Other addressing systems may be used without departing from the scope of the present invention.

The datastore comprises a user identifier associated with a user address. The receiving device monitor provides state data indicative of a state of the receiving device and provides proximity data indicative of a potential user being within a preset access distance of the receiving device to receive communications from the sending device. The proximity data comprises a user identifier associated with the potential user. The status file is connected to the equipment and to the first network and receives the output signals from the state data and proximity data from the receiving device monitor. The sending device is connected to the first network and the second network and accesses the status file over the first network and obtains the state data and the proximity data of the receiving device. By way of illustration and not as a limitation, the status file comprises the off-hook status of a telephone if the of telephone is off hook and the on-hook status of a telephone if the telephone is on-hook. Using the user identifier, the receiving device monitor obtains a user address and routes communications addressed to the user address to the receiving device address via the second network.

According to embodiments disclosed in the Ser. No. 11/123,490 application, the first and second networks are selected from the group consisting of a wired network, wireless network, a fiber network, hybrid fiber coax network, a switched network, a packet-based network, a cable network, a public switched telephone network, and the Internet. According to other embodiments of the present invention, the receiving device is selected from the group consisting of a telephone, a computing device, adapted to provide voice over IP, a digital telephone adapted to provide voice over a packet switched network, a personal data assistance, a cell phone, a radio phone, and a video phone.

According to embodiments disclosed in the Ser. No. 11/123,490 application, the sending device is selected from the group consisting of a telephone, a computing device, a adapted to provide voice over IP, a digital telephone adapted to provide voice over a packet switched network, a personal data assistance, a cell phone, a radio phone, a video phone, a switch, a router, a proxy server, and a PBX.

In still another embodiment disclosed in the Ser. No. 11/123,490 application, the system further comprises a second network. According to this embodiment, the sending device associates a user address with the user identifier, and routes communications addressed to the user address to the address of the receiving device via the second network.

According to embodiments disclosed in the Ser. No. 11/123,490 application, the second network is selected from the group consisting of a wired network, wireless network, a fiber network, hybrid fiber coax network, a switched network, a packet-based network, a cable network, a public switched telephone network, and the Internet.

In an embodiment disclosed in the Ser. No. 11/123,490 application, a system for obtaining status of a receiving device over a network comprises the receiving device, a datastore, an RFID tag comprising an RFID tag identifier that is associated with the user identifier, a receiving device state monitor that provides state data indicative of a state of the receiving device, an RFID monitor that provides proximity data indicative of the RFID tag being located within a preset access distance of the receiving device, and wherein the proximity data comprises the RFID tag identifier, a status file that receives device state data and proximity data, a first network, a second network.

In an embodiment disclosed in the Ser. No. 11/123,490 application, the receiving device comprises a receiving device address and is adapted to receive communications from a sending device, the datastore comprises a user identifier, and proximity data comprises a user identifier of a potential user of the receiving device. The sending device accesses the status file over the first network, obtains the state data and the proximity data of the receiving device, using the RFID identifier, obtains the user identifier and the user address, and routes communications addressed to the user address to the receiving device address via the second network. In yet another embodiment disclosed in the Ser. No. 11/123,490 application, the RFID monitor determines the presence of an RFID tag within the preset distance of the receiving device and provides the proximity.

As described above, the Status Applications provide systems and processes for determining the status of a variety of devices via a network. The importance of device status cannot be overstated. For example, dwelling and vehicle security is a multi-billion dollar industry. The FBI reports a burglary occurs every 15.4 seconds. It has also been reported that a home without a security system is 2 to 3 times more likely to be burglarized.

Dwelling alarm systems typically comprise sensors, annunciators, and telecom paths. Sensors include those for fire, motion within a room, structural movement (e.g., doors and windows), sound (e.g., glass breaking), and panic buttons (e.g., medical or threat emergencies). Annunciators, which are activated when a sensor is triggered, include local audible alarms (e.g., sirens, bells, voice warnings) and messages sent using the telecom paths to an alarm call center (a central station where operators monitor alarms from alarm service subscribers) or directly to an alarm authority (e.g., police, fire department, ambulance). Video and audio data may also be captured and transmitted.

Typically, a local sensor in a multi-sensor alarm system detects fire, motion within a room, structural movement, specific sounds, operation of a panic buttons, or other state for which a sensor is designed (each such detection is an "alarm trigger") and sends a signal to a local processor ("sensor hub"), usually on premises. The sensor hub then sends a signal over a wireline (e.g., dial-up or leased telephone line, DSL, cable modem) or wireless (e.g., mobile phone network, private radio service) to an alarm call center or alarm authority, where a response to the alarm is undertaken.

There are several problems with typical alarm systems. Basic dwelling alarm systems typically do not differentiate between types of alarms (e.g., fire, motion, medical). This lack of differentiation requires the alarm call center to interpret the alarms received. Errors can be made in this interpretation, and the wrong type of alarm response dispatched. Improved home alarm systems, such as that disclosed in U.S. Pat. No. 6,215,404, granted to Morales, include a means of analyzing the local annunciator sound output (e.g., siren, bell), in essence, performing an electronic interpretation of the type of alarm.

While the emphasis on alarm systems has been to improve the reporting of an alarm condition to an alarm authority, the owner of the dwelling or vehicle that is subject to monitoring is not able to independently monitor alarm sensors.

Individuals not only have an interest in the status of alarm sensors but in the status of other devices as well. By way of illustration, a homeowner may wish to monitor the status of a heating/cooling system, a refrigerator, a hot water heater, water pipes, a swimming pool, a computer, and other systems and devices. Of particular utility is the ability to monitor such systems and devices remotely and to issue control commands to controllable devices. For example, a non-resident homeowner could monitor the temperature of a vacation home and determine whether to instruct a thermostat to increase or decrease the inside temperature.

Communications devices also have states that can be monitored and used to make decisions. A typical telephone status comprises an "on-hook" state and an "off-hook" state. Digital communications devices may have additional states that may be important in making decisions. For example, and not as a limitation, real time knowledge of the state of a communications device can be used to determine when to place a call to a party, what communication device to call, where to forward a call, whether a communications device and/or a user are present on a network, and to automatically call a party when a telephone changes from an off-hook state to an on-hook state.

What is desired is a system whereby the status of a monitored device can be determined remotely and decisions can be made based on the status. The desired system would allow decisions to be made by a user or to be made automatically by another device responsive to the status of the monitored device. Additionally, a desired system would allow the monitored device to be controlled remotely based on the monitored device status.

SUMMARY

An embodiment of the present invention provides a system for monitoring the status of a device and saving device status information in device status file that is accessible over a network.

It is an aspect of the present invention to provide a status of a device to a file that is accessible remotely.

It is a further aspect of the present invention to continually monitor the status of a device in order to provide the device status information desired.

It is a further aspect of the present invention to provide the device status information to the status file over a network.

It is another aspect of the present invention to provide the device status information to the status file over network chosen from a private network, a cable network, the public switched telephone network, the Internet, and a wireless network.

It is yet another aspect of the present invention to provide access to the device status information to the status file over a network.

It is another aspect of the present invention to provide access to the status file over network chosen from a private network, a cable network, the public switched telephone network, the Internet, and a wireless network.

It is still another aspect of the present invention to provide device status information to the status file over one network and to provide access to the status file over another network.

It is an aspect of the present invention to provide the status of security sensing devices to a status file that is accessible remotely.

It is another aspect of the present invention to provide the status of environmental devices to a status file that is accessible remotely.

It is still another aspect of the present invention to provide the status of a plain old telephone connected to the public switched telephone network to a status file that is accessible remotely.

It is yet another aspect of the present invention to provide the status of a telephone connected to a to a packet switched network to a status file that is accessible remotely.

It is an aspect of the present invention to provide the status of a telephone that is adapted to provide communications over a voice over IP system.

It is another aspect of the present invention to provide a status of a receiving device, wherein the status comprises a user identifier of a potential user of the receiving device determined to be within a configurable access distance of the receiving device.

It is yet another aspect of the present invention to determine the proximity of a potential user of a receiving device using RFID devices.

It is still another aspect of the present invention to use RFID devices to establish permissions of a visitor to a facility.

These and other aspects of the present invention will become apparent from a review of the general and detailed descriptions that follow.

In an embodiment of the present invention, a system for obtaining a status of an authorization device over a network comprises equipment that provides output signals indicative of the status of the authorization device, a status file connected to the equipment and to a first network, and an authorization datastore connected to the first network. By way of illustration and not as a limitation, the first network may be a wired network, wireless network, a fiber network, hybrid fiber coax network, a switched network, a packet-based network, a cable network, a public switched telephone network, and the Internet.

The equipment provides output signals indicative of the status of the authorization device. In an embodiment of the present invention, the status comprises a user identifier of a user determined to be within a configurable access distance of the authorization device and seeking permission to a use a controlled device. The status file receives the output signals from the equipment.

The authorization datastore accesses the status file over the first network and obtains the status of the authorization device. A determination is made from the user identifier if the user is authorized to use the controlled device. Permission is granted to the user to use the controlled device if the user is determined to be authorized to use the controlled device. By way of illustration and not as a limitation, the controlled device may be a door entry system, a telephone, a refrigerator, an entertainment system, and a computing device.

In another embodiment of the present invention, the authorization device may be located in a hotel, a hospital, a cruise ship, a movie theater, an educational institution, an employment center, a detainment facility, a military facility, a police facility, a governmental office, and a research facility. However, this is not meant as a limitation. The authorization device may be deployed wherever identification and permission functionality are desirable.

In yet another embodiment of the present invention, the controlled device comprises a receiving device and the system tem further comprises a sending device and a second network. In this embodiment, the sending device associates a user address with the user identifier and routes communications addressed to the user address to an address of the receiving device via the second network. By way of illustration and not as a limitation, the second network may be a wired network, a wireless network, a fiber network, hybrid fiber coax network, a switched network, a packet-based network, a cable network, a public switched telephone network, and the Internet. In still another embodiment of the present invention, the controlled device is a telephone and the user address and the controlled device address are telephone numbers.

In another embodiment of the present invention, the user identifier is associated with an RFID tag comprising an RFID tag identifier and the equipment comprises an RFID monitor. The equipment detects a presence of the RFID tag within the configurable access distance, and acquires the RFID tag identifier from the RFID tag.

Another embodiment of the present invention provides a method for obtaining a status of an authorization device over a network. The status of the authorization device is inputted into a status file, wherein the status comprises a user identifier of a user determined to be within a configurable access distance of the authorization device and seeking permission to a use a controlled device. The status file is accessed over a first network and the status of the authorization device is obtained. By way of illustration and not as a limitation, the first network may be a wired network, wireless network, a fiber network, hybrid fiber coax network, a switched network, a packet-based network, a cable network, a public switched telephone network, and the Internet. From the user identifier is determined whether the user is authorized to use the controlled device. Permission is granted to the user to use the controlled device if the user is determined to be authorized to use the controlled device. By way of illustration and not as a limitation, the controlled device may be a door entry system, a telephone, a refrigerator, an entertainment system, and a computing device.

In another embodiment of the present invention, the authorization device may be located in a hotel, a hospital, a cruise ship, a movie theater, an educational institution, an employment center, a detainment facility, a military facility, a police facility, a governmental office, and a research facility. However, this is not meant as a limitation. The authorization device may be deployed wherever identification and permission functionality are desirable.

In still another embodiment of the present invention, the controlled device comprises a receiving device. In this embodiment, a user address is associated with the user identifier. Communications are routed from a sending device addressed to the user address to an address of the receiving device via a second network. By way of illustration and not as a limitation, the second network may be a wired network, a wireless network, a fiber network, hybrid fiber coax network, a switched network, a packet-based network, a cable network, a public switched telephone network, and the Internet. In still another embodiment of the present invention, the controlled device is a telephone and the user address and the controlled device address are telephone numbers.

In an embodiment of the present invention, the user identifier is associated with an RFID tag comprising and RFID tag identifier. In this embodiment, the presence of the RFID tag within the configurable access distance is detected. The RFID tag identifier is acquired from the RFID tag, and the RFID tag identifier is inputted into the status file.

DESCRIPTION OF THE DRAWINGS

Additional aspects and advantages of the present invention will be apparent in the following detailed description read in conjunction with the accompanying drawing figures.

DETAILED DESCRIPTION

An embodiment of the present invention provides a system for monitoring the status of a device and saving device status information in device status file that is accessible over a network.

Figure 1:
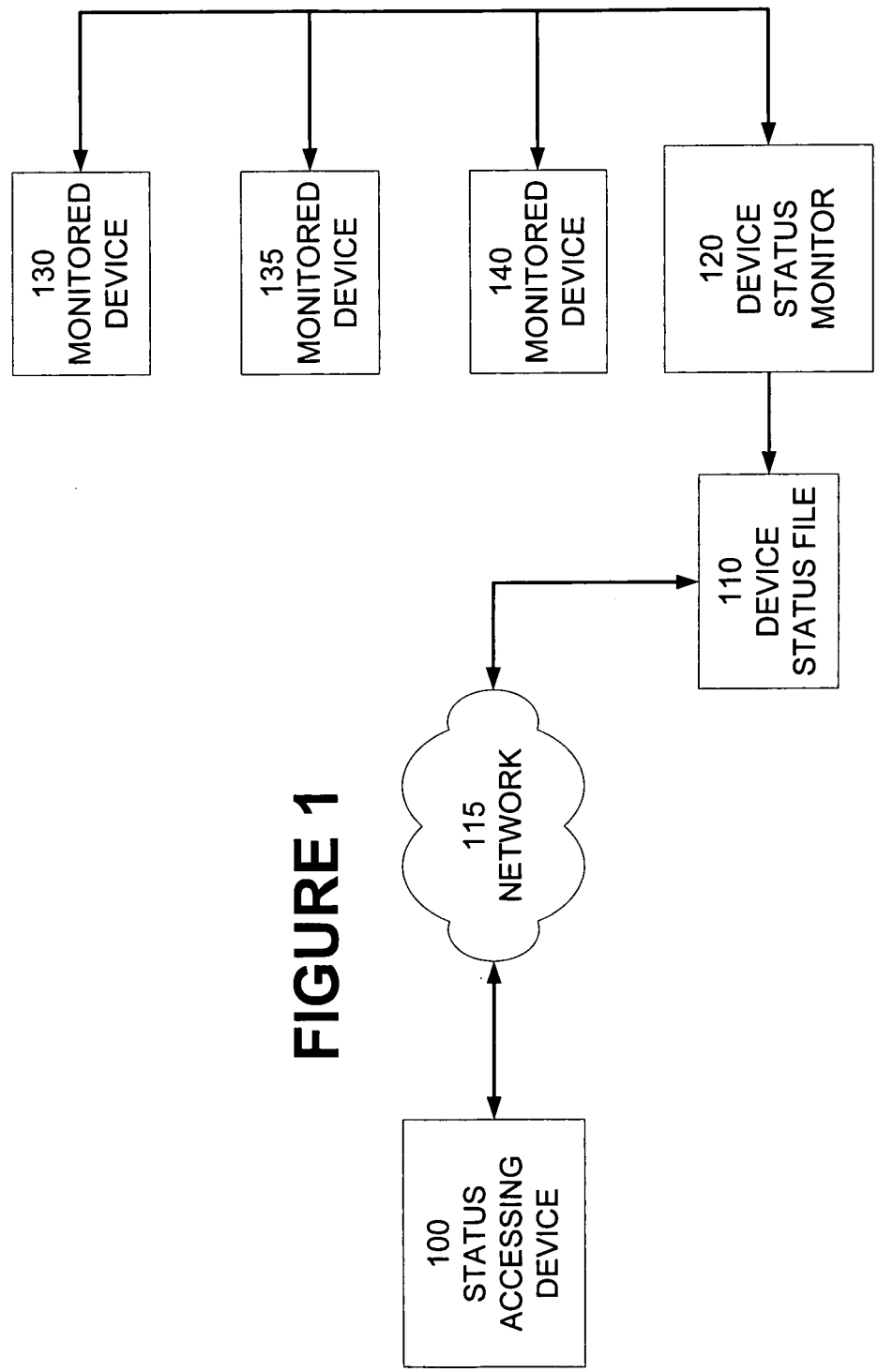
FIG. 1 illustrates the basic architecture of an equipment status monitor according to an embodiment of the present invention.

FIG. 1 illustrates the basic architecture of an equipment status monitor according to an embodiment of the present invention. Referring to FIG. 1, a status accessing device 100 accesses a device status file 110 via network 115. In an embodiment of the present invention, the status accessing device 100 is a computer, although this is not meant as a limitation. Status accessing device 100 may be any device capable of communicating with device status file 110 over network 115. By way of illustration and not as a limitation, status accessing device 100 may be a general purpose computer, a laptop computer, a personal digital assistant (PDA), a telephone, or a cell phone. By way of illustration and not as a limitation, network 115 may be the public switched telephone network (PSTN), a packet switched network, the Internet, a wireless network, or a cell phone network. Device status file 110 is continually updated by a device status monitor 120 that constantly monitors a series of monitored devices 130, 135, and 140.

It should be noted that it is anticipated that many thousands of devices will be monitored in this fashion. Eventually it is anticipated that millions of device will be so monitored. The monitoring function can be accomplished by special equipment for that purpose or is simply the output of monitored device designed to report to a status monitor 120.

The device status file 110 is continually updated by device status monitor 120 with status information indicative of the status of a monitored device (130-140). By way of illustration and not as a limitation, in an embodiment of the present invention, monitored device 130 is a telephone and the status information comprises its on-hook or off-hook status. In this embodiment, a calling party communicating with status accessing device 100 can receive "real time" status (as determined by the sampling rate of device status monitor 120) of monitored device (telephone) 130 being called by simply monitoring the equipment status file that is accessible over network 115. Since the status file is anticipated to contain many thousands of numbers it is anticipated as part of the present invention that when a calling party using status accessing device 100 requests the status of a particular telephone that only the status of that telephone will be returned to the user. Alternatively, a user of status accessing device 100 may create a list of numbers to monitor and have the data "pushed" over network 115 to the status accessing device 100.

In yet another embodiment of the present invention, monitored device 130 comprises a security-sensing device. In this embodiment, the status information gathered by device status monitor 120 is associated with a measure of security that is sensed by the security sensing device. By way of illustration and not as a limitation, in an embodiment of the present invention, a security-sensing device may be a motion detector, an audio detector, and an intrusion detector. The status information associated with a motion detector is movement, the status information associated with the audio detector is a change in sound levels over an ambient sound level and the status information associated with an intrusion detector is the opening of a closed access means, such as a door or a window.

Dwelling alarm systems typically comprise sensors, annunciators, and telecom paths. Sensors include those for fire, motion within a room, structural movement (e.g., doors and windows), sound (e.g., glass breaking), and panic buttons (e.g., medical or threat emergencies). Annunciators, which are activated when a sensor is triggered, include local audible alarms (e.g., sirens, bells, voice warnings) and messages sent using the telecom paths to an alarm call center (a central station where operators monitor alarms from alarm service subscribers) or directly to an alarm authority (e.g., police, fire department, ambulance). Video and audio data may also be captured and transmitted. Typically, a local sensor in a multi-sensor alarm system detects fire, motion within a room, structural movement, specific sounds, operation of a panic buttons, or other state for which a sensor is designed (each such detection is an "alarm trigger") and sends a signal to a local processor ("sensor hub"), usually on premises. The sensor hub then sends a signal over a wireline (e.g., dial-up or leased telephone line, DSL, cable modem) or wireless (e.g., mobile phone network, private radio service) to an alarm call center or alarm authority, where a response to the alarm is undertaken.

In another embodiment of the present invention, monitored device 130 is a computer. In this embodiment, the status information gathered by device status monitor 120 is associated with measures of performance and current state of the monitored device (computer) 130. By way of illustration and not as a limitation, status information associated with the computer is its presence on line, its memory usage, its temperature, processes that are running, processes that have been completed, and any detected failures of hardware or software.

Figure 2:
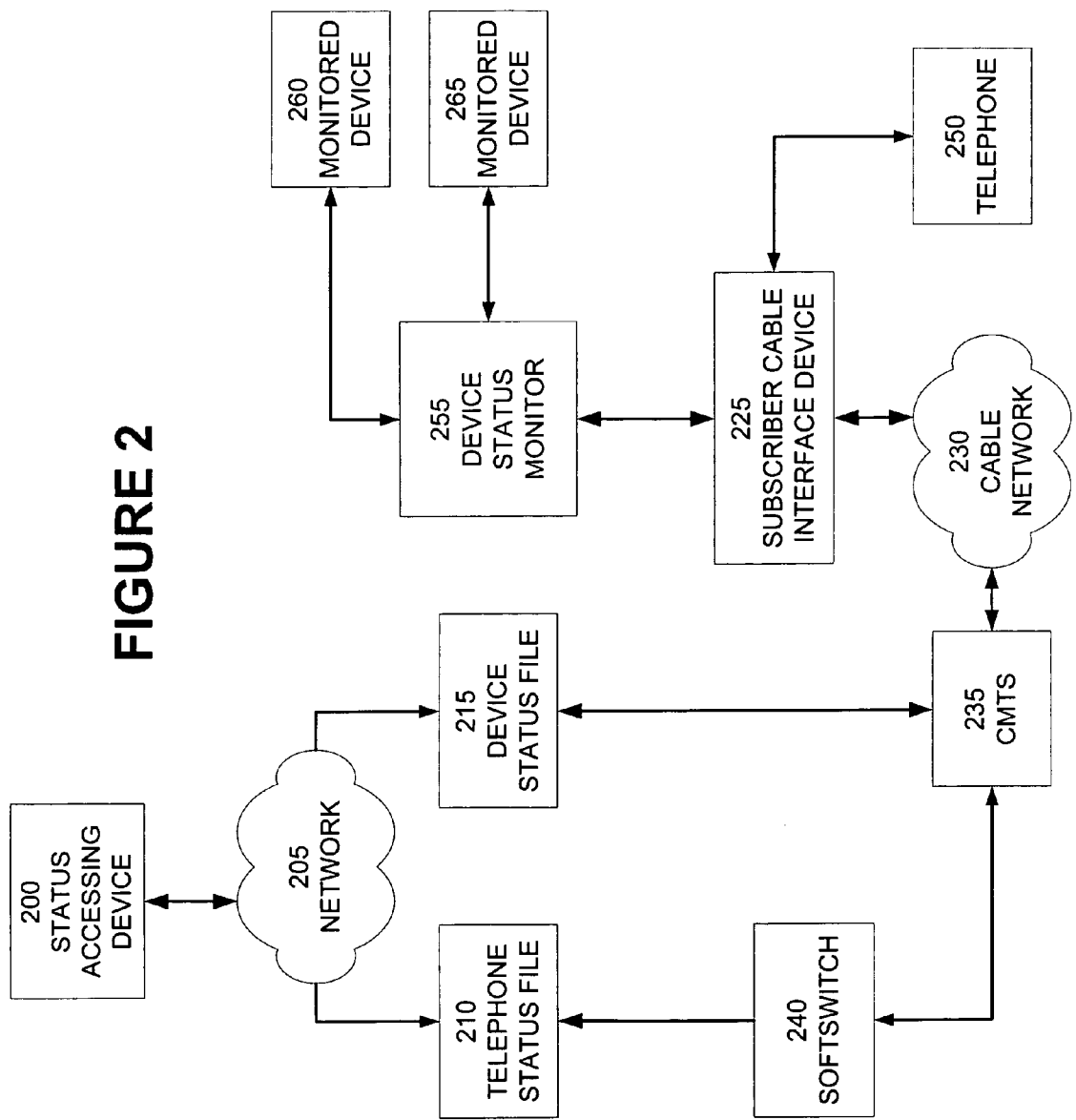
FIG. 2 illustrates an equipment status monitor according to an alternate embodiment of the present invention.

FIG. 2 illustrates an equipment status monitor according to an alternate embodiment of the present invention. Referring to FIG. 2, a status-accessing device 200 accesses a telephone status file 210 and a device status file 215 via network 205. In an embodiment of the present invention, the status-accessing device 200 is a computer, although this is not meant as a limitation. Status accessing device 200 may be any device capable of communicating with telephone status file 210 and/or device status file 215 over network 205. By way of illustration and not as a limitation, status-accessing device 200 may be a general purpose computer, a laptop computer, a personal digital assistant (PDA), a telephone, or a cell phone. By way of illustration and not as a limitation, network 205 may be the public switched telephone network (PSTN), a packet switched network, the Internet, a wireless network, or a cell phone network.

As illustrated in FIG. 2, telephone status file 210 is logically distinct from device status file 215. In this embodiment of the present invention, the status of telephone 250 is monitored by subscriber cable interface device 220 and reported to softswitch 240.

In an embodiment of the present invention, telephone 250 may be a digital telephone adapted for communicating over a packet network, a digital telephone adapted for communicating over a VoIP system, a POTs telephone, a wireless telephone, or other communications device.

In an embodiment of the present invention, subscriber cable interface device 225 comprises a set top box. However, this is not meant as a limitation. As disclosed in application Ser. No. 08/963,373, the connection of the cable system can also be through any other voice/data interface provided by the cable carrier since set top boxes will not be the only interface to voice and data services over cable. By way of illustration and not as a limitation, subscriber interface device 225 may be a DOCSIS-compliant cable modem (CM) connected to an external media terminal adapter (MTA). In another embodiment of the present invention, the subscriber cable interface 225 comprises an integrated CM and MTA. In yet another embodiment of the present invention, the subscriber cable interface 225 comprises a set top box that is adapted to receive communications over the cable network (that is, downstream) and to send communications over the cable network (that is, upstream) or another network, such as the PSTN, a wireless network, or the Internet.

Device status monitor 255 determines the status of monitored devices 260 and 265. Telephone status file 210 is continually updated by softswitch 240 and device status file 215 is continually updated by device status monitor 255. However, this is not meant as a limitation. In another embodiment of the present invention, monitored device 260 is a telephone that and the status information is provided to device status monitor 255. In this embodiment, the status of monitored device (telephone) 260 is reported to device status file 210.

Both device status monitor 255 and subscriber cable interface device 220 are adapted to send status information as packets over cable network 230 to CMTS 235. CMTS 235 routes the status file information packets to either softswitch 240 or device status file 215, as appropriate.

Figure 3:
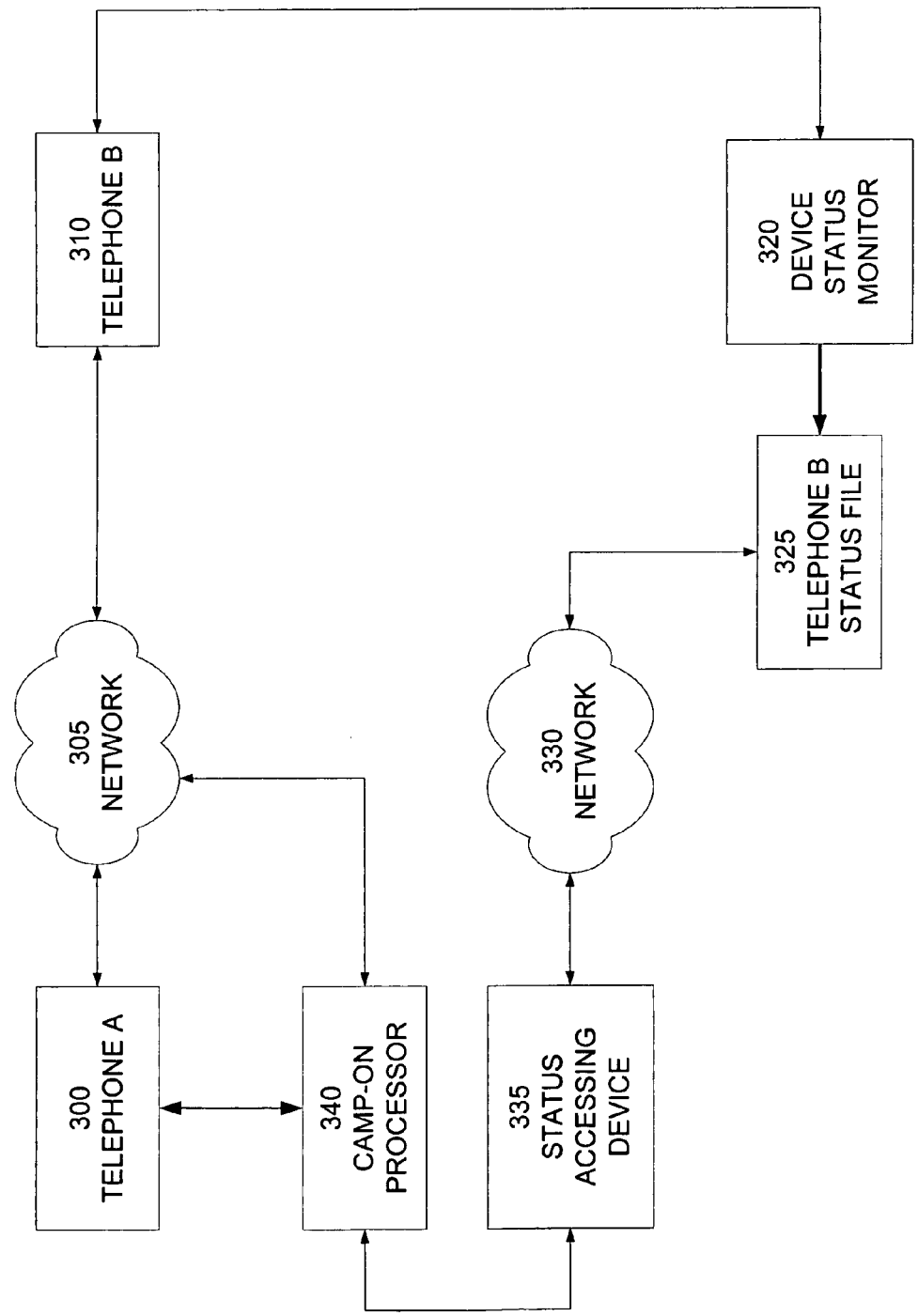
FIG. 3 illustrates an operational process of a telephone status monitor according to the present invention.

FIG. 3 illustrates a call camp-on feature according to an embodiment of the present invention. In this embodiment, telephone A 300 desires to call telephone B 310 via network 305. Telephony/data interface 320 monitors the status of telephone B 310 and sends telephone status information to telephone B status file 325. In this embodiment, telephone status information comprises an on-hook and an off-hook state of telephone B 310. Telephone B status file 325 is accessible to a status accessing device 335 via network 330. Telephone B status information is also sent to camp-on processor 340.

Telephone A 300 initiates a call to telephone B 310 through camp-on processor 340. Camp-on processor 340 determines the status of telephone B 310 by polling status accessing device 335. If the status of telephone B 310 is on-hook, the call is placed by camp-on processor 340 and switched to telephone A 300. If the status of telephone B 310 is off-hook, camp-on processor 340 monitors status accessing device to determine when telephone B 310 transitions to an on-hook state, then places a call to telephone B 310. The call is transferred to telephone A 300.

In an embodiment of the present invention, network 305 is the public switched network. However, this is not meant as a limitation. Network 305 may be any network on which telephone calls may be placed. By way of illustration and not as a limitation, network 305 may be the Internet and the communications between telephone A 300 and telephone B 310 may be VoIP calls.

As will be appreciated by those skilled in the art, while network 305 is illustrated as a single network, the path between telephone A 300 and telephone B 305 may comprise a number of networks using various transport means and signaling protocols. By way of illustration and not as a limitation, a call originating from telephone A 300 may be a VoIP call placed over a cable network that is routed to telephone B 310 via the PSTN. One such protocol is the session initiation protocol (SIP).

In an embodiment of the present invention, network 330 may be the public switched telephone network (PSTN), a packet switched network, the Internet, a wireless network, or a cell phone network.

In another embodiment of the present invention, the status of a device is presented and a user of a status accessing device is provided the ability to control the device remotely.

Figure 4:
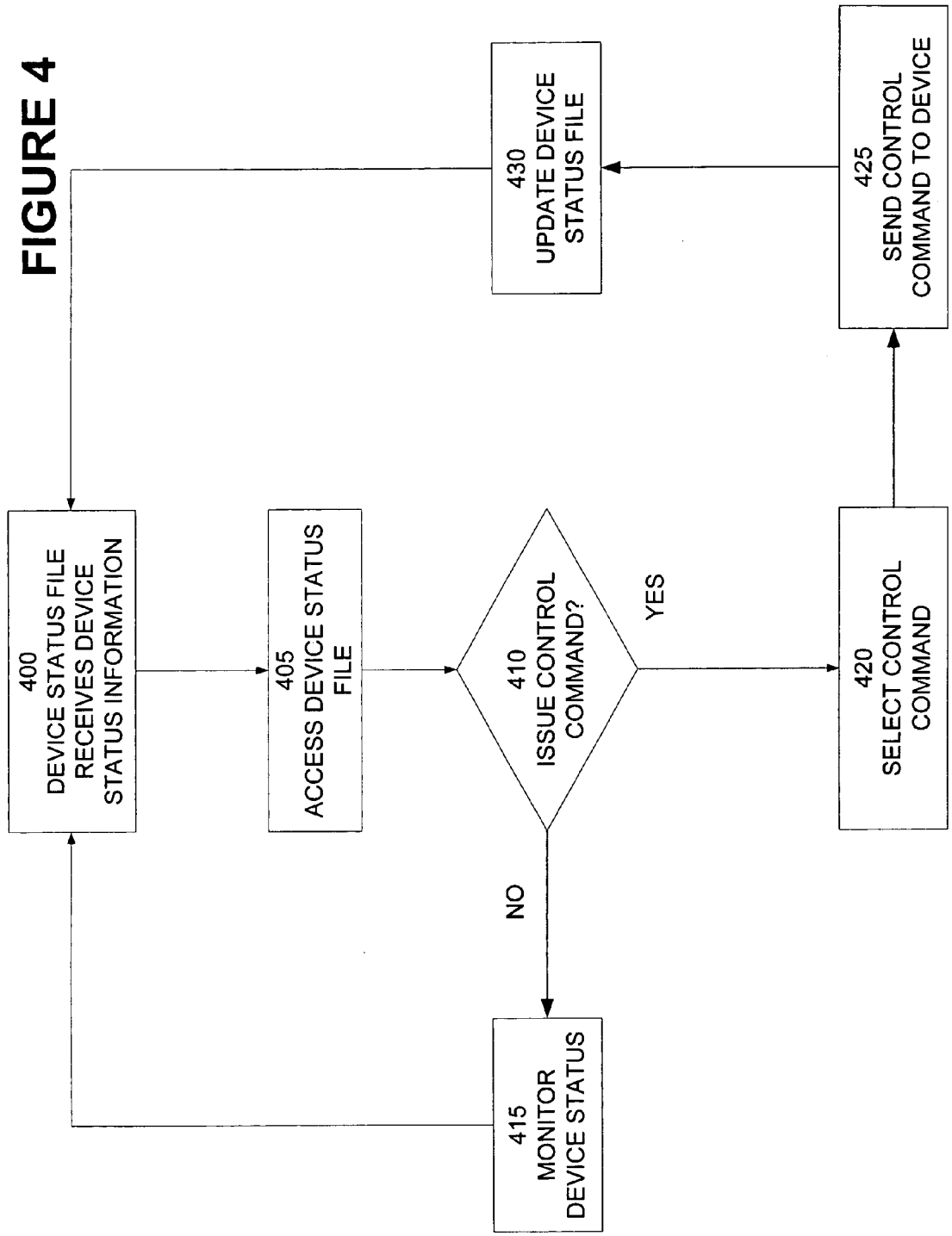
FIG. 4 illustrates an operational process of a telephone status monitor according to an alternate embodiment.

FIG. 4 illustrates a flow of a process by which a status of a thermal control device is obtained and a control option is presented according to an embodiment of the present invention.

Referring to FIG. 4, a device status file of a controllable device receives device status information 400. The device status information is accessed 405 and the option to issue a control command is presented 410. If the option to issue a control command is not exercised, the device status is monitored 415 and process repeats 400. If the option to issue a control is exercised, the control command is selected 420 and the selected command is sent to the controllable device 425. The device status is monitored and the status information is updated to reflect the issuance of the control command 430 and the process repeats 400. By way of illustration and not as a limitation, in an embodiment of the present invention, the controllable device is a thermostat and the control command is selected from raise temperature and lower temperature. In another embodiment of the present invention, the controllable device is a security monitoring device and the control command is directed to the security monitoring device. By way of illustration and not as a limitation, the security monitoring device is a video camera and the control command is selected from the group consisting of pan up, pan down, pan left, pan right, zoom in, and zoom out.

Figure 5:
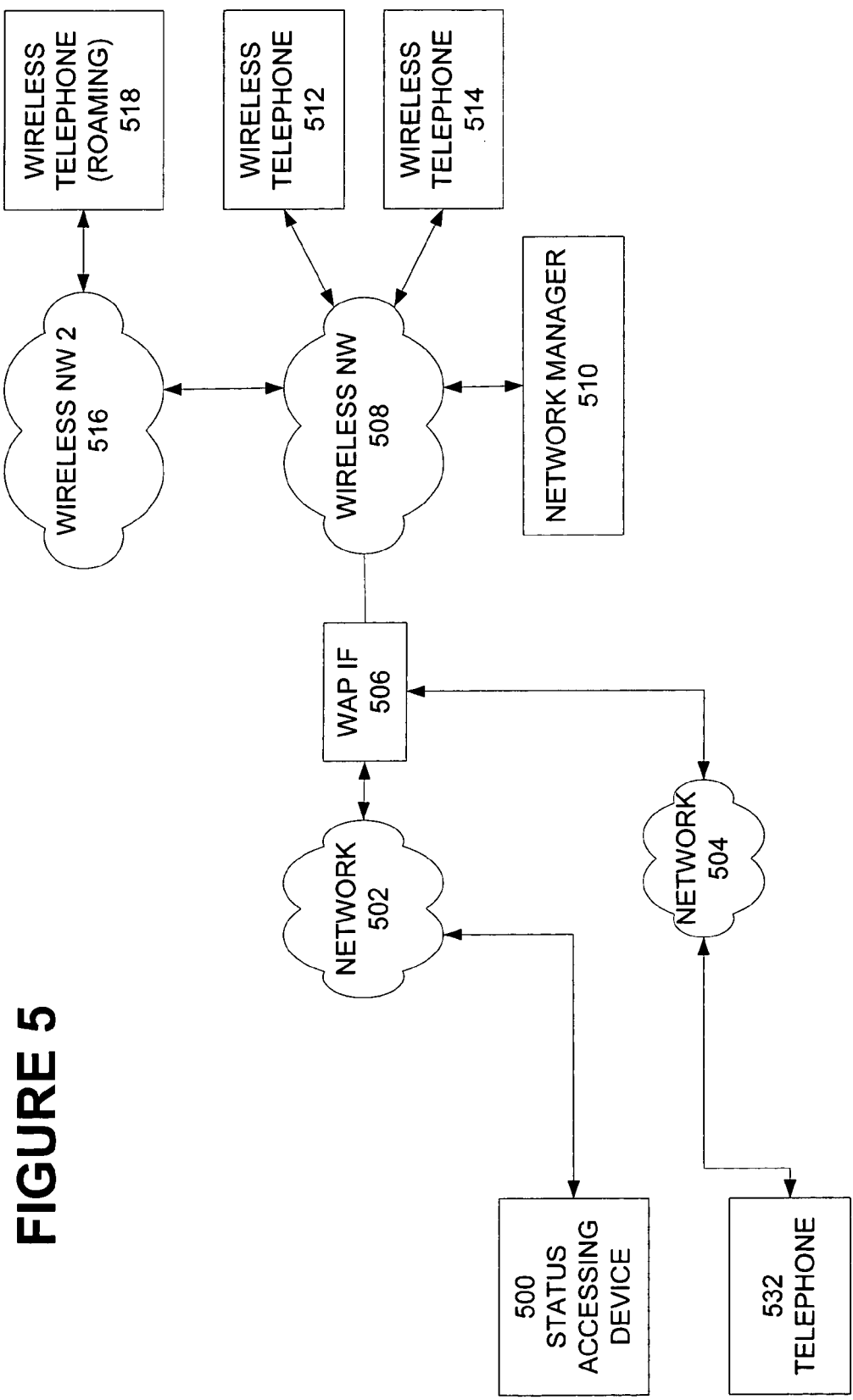
FIG. 5 illustrates a telephone status monitor system embodiment using wireless network components.

Referring to FIG. 5, an alternative embodiment of the present invention is illustrated. While it is important for callers to be able to ascertain whether the party is online or not, this is also particularly important when one is dealing with wireless communications. For example, and as described earlier, status accessing device 500 access network 502 to ascertain the status of wireless telephones 512, 514, and 518. The query concerning the equipment status then proceeds through a wireless application protocol (WAP) interface 506 to wireless network 508. The request then flows to the wireless network manager 510 which records which wireless phones are currently available on the network and which of those telephones is engaged in an active telephone call. Thus network manager 510 "knows" that wireless telephones 512 and 514 are available for telephone calls or in the alternative that, for example, wireless telephone 514 is engaged in an active phone call. This information is then sent by network manager 510 over wireless network 508 through WAP interface 506 through network 502 to status access device 500. At that point the user of status accessing device 500 can decide to make a telephone call using telephone 532 and network 504 through the WAP interface 506 over wireless network 508 to the wireless telephones 112, 114. In an embodiment of the present invention, telephone 532 is a conventional telephone and network 504 is the PSTN. In another embodiment of the present invention, telephone 532 is adapted to use the VoIP and network 504 is an IP network.

Knowledge of the status of telephones is particularly important where telecommunications service providers (TSPs) utilize business models based on charging the caller for calls made over the TSP's facilities. The PSTN uses this model as do providers of VoIP services. Wireless providers may also shift to this model. Thus, in a situation where a caller is charged for all telephone calls made, it will be particularly important to the caller that it not get charged for leaving a message over a wireless network which tends to be particularly expensive.

The expense in dealing with a wireless network is all the more apparent when one considers that a telephone may be in a "roaming" mode where the telephone is in a network that is not the home network for the wireless telephone. Thus, in the case where wireless telephone 518 is roaming in a second wireless network 516, a telephone call that is not completed or wherein a message is simply left, becomes all the more expensive since roaming charges will be charged to the caller as well.

Figure 6:
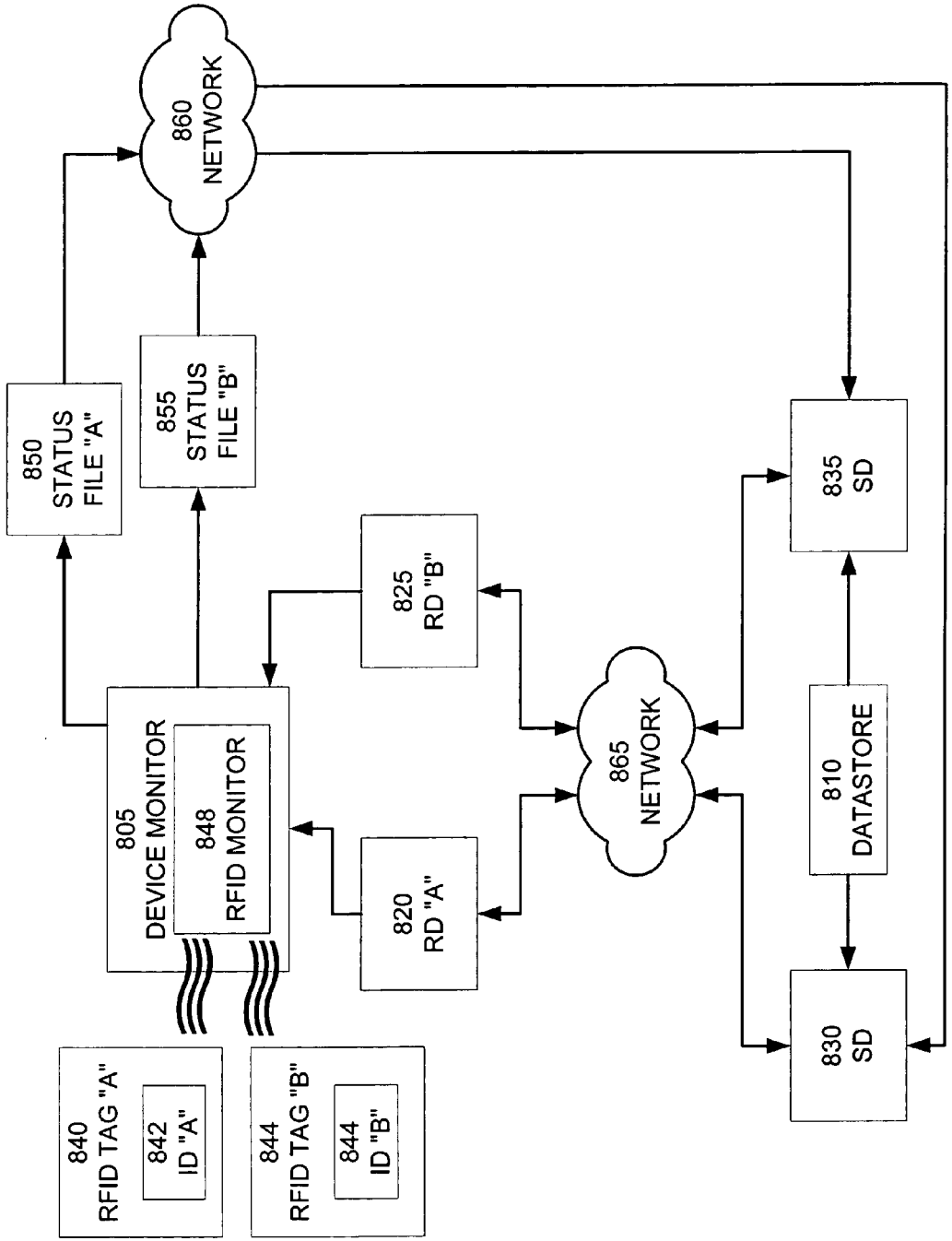
FIG. 6 illustrates the logical elements of a status monitoring system utilizing an RFID tag according to embodiments of the present invention.

FIG. 6 illustrates the logical elements of a status monitoring system utilizing an RFID tag according to embodiments of the present invention. Referring to FIG. 6, a device monitor 805 monitors the status of receiving devices RD "A" 820 and RD "B" 825. RD "A" 820 and RD "B" 825 each comprise an unique address. Device monitor 805 creates status file "A" 850 comprising the status of RD "A" 820 and status file "B" 855 comprising the status of RD "B" 825. These status files are available over network 860 sending devices 830 and 835. Sending devices 830 and 835 select a receiving device (RD "A" 820 and/or RD "B" 825) to communicate with using the address of the selected receiving device. Communications are established via network 865.

In an embodiment of the present invention, receiving devices RD "A" 820 and RD "B" 825 are telephones and the addresses are telephone numbers. As previously described, the status of a telephone receiving device comprises the "on-hook" or "off-hook" state of the receiving device and other information about the state of the device that would be useful to a sending device. By way of illustration and not as a limitation, the status may include whether the device is forwarded, the number of rings before the device is answered by an automated answering device, and similar state information.

As will be appreciated by those skilled in the art, communications may be established between other sending devices and receiving devices without departing from the scope of the present invention. By way of illustration and not as a limitation, receiving devices and sending devices may be a computing device, a digital telephone providing voice over IP, a personal data assistance, a cell phone, a radio phone, a video phone, and the like. Additionally, sending devices may be switches, routers, proxy servers and other devices that broker communications between receiving devices and other sending devices.

The status of a receiving device is directly related to the media the receiving device uses for communication, the type of communications the receiving device receives, and the functionality that is embodied in the receiving device. By way of illustration, if the receiving device is an IP networked device, the status comprises the IP address of the receiving device, port information, firewall information, and network address translation information.

Networks 860 and 865 may be wired, wireless, fiber, hybrid fiber coax, switched, packet-based, and combinations of the same. Additionally, networks 860 and 865 may be the same or different media. In an exemplary embodiment, network 860 is the Internet. In another exemplary embodiment, network 865 is a telephone network.

In an exemplary embodiment of the present invention, the status of a receiving device further comprises a recipient list of users able to use the receiving device at any particular time. In this exemplary embodiment, the recipient list is created by the receiving device in response to the detection of a qualified user within a configurable access distance of the receiving device. A sending device may access this status information and determine how to communicate with a user on the recipient list.

Referring again to FIG. 6, device monitor 805 further comprises an RFID monitor 848 that may communicate with RFID tag "A" 840 and RFID tag "B" 844. In the embodiment illustrated in FIG. 6, RFID tags 840 and 844 are passive devices. However, the present invention is not so limited. Semi-passive or active RFID tags may be utilized without departing from the scope of the present invention. Additionally, RFID tags 840 and 844 comprise memory (not illustrated) in which RFID identifier "A" 842 and RFID identifier "B" 846 are stored. The memory may be either a read only memory or programmable read/write memory.

RFID monitor 848 polls RFID tag "A" 840 and RFID tag "B" 844. An RFID tag within a preset distance of RFID monitor 848 will respond with a reflected signal comprising an RFID identifier of the responding tag. If RFID tag "A" 840 responds to the poll from RFID monitor 848, RFID monitor 848 will receive RFID identifier "A" 842. If RFID tag "B" 844 responds to the poll from RFID monitor 848, RFID monitor 848 will receive RFID identifier "B" 846. If both tags respond to the poll, RFID monitor 848 will received both RFID identifier "A" 842 and RFID identifier "B" 846. The RFID identifiers are then added to the appropriate receiving device status file.

Both sending devices 830 and 835 have access to the receiving device status files (850 and 855) and to datastore 810. Datastore 810 maps an RFID identifier in a receiving device status file to an address associated with a user and to an address of the receiving device associated with the receiving device status file. Thus, a sending device "knows" at a point in time (determined by the polling rate of RFID monitor 848) that a user is within a preset proximity to a receiving device. A communication directed to that user's address may then be directed to the address of that receiving device.

In an alternate embodiment of the present invention, access to the status information of a receiving device is limited to a sending device or a sender that has been pre-qualified to access that status information. The identity of the sending device or caller is established using the address of the sending device or an identifier of the sender. By way of illustration and not as a limitation, a sending device may be identified by its network address or MAC address and a sender may be identified by his or her telephone number, e-mail address, or SIP address. In yet another embodiment of the present invention, the sender may be prompted for a user ID.

As will be appreciated by those skilled in the art, the status monitoring system illustrated in FIG. 6 and described above may be used in many applications. By way of illustration and not as a limitation, in an embodiment of the present invention, a status monitoring system monitors a telephone system. In this embodiment, the telephone system may be operated within an office, a hotel, a hospital, a home, an airport, and similar environments. The system may comprise a single location or multiple locations.

In this embodiment, a sending device (830) is a switching device that receives a call from a calling party directed to a called party using the called party's telephone number. The called party is assigned to RD "A" 820 and RFID tag "A" 840. Sending device 830 checks status file "A" 850 and determines that the called party is not in proximity to the RD "A" 820. Sending device 830 then checks the status files of all other receiving devices on the network to determine whether the called party is in proximity to any other receiving device. In this example, ID "A" 842 associated with RFID tag "A" 840 assigned to the called party is located in status file "B" 855 indicating that the called party is in proximity to RD "B" 825. Send device 830 redirects the call to RD "B" 825 and the parties are connected.

Figure 7:
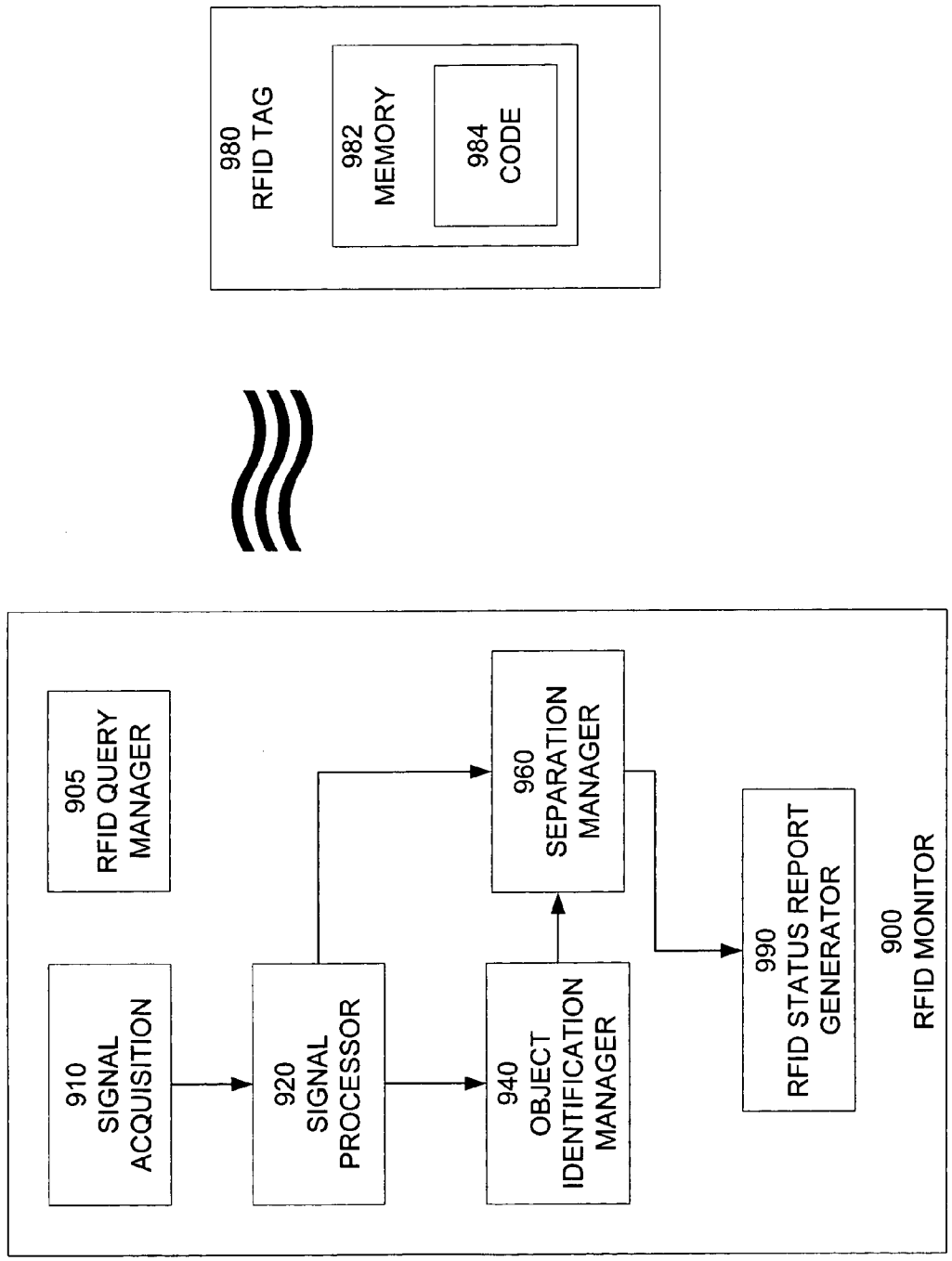
FIG. 7 illustrates the components of an RFID monitor according to an embodiment of the present invention.

FIG. 7 illustrates the components of an RFID monitor according to an embodiment of the present invention.

Referring to FIG. 7, an RFID monitor 900 comprises a signal acquisition element 910, a signal processor 920, an object identification manager 940, a separation manager 960, an RFID status report generator 990, and an RFID tag query manager 905.

RFID query manager 905 sends a query signal during a preset time period. In another embodiment of the present invention, the power of the query signal sent by query manager 905 may be adjusted. The query signal is received by an RFID tag 980 and reflected back to alert module 900. The reflected signal comprises the code 982 stored in memory 984. Signal acquisition element 910 receives the reflected signal emitted by RFID tag 980. The signal acquisition element 910 comprises a device or devices appropriated to receive the signal generated by RFID tag 980. In an embodiment of the present invention, the sensitivity of the signal acquisition element 910 may be adjusted. The reflected signal from the signal acquisition element 910 is received and processed by signal processor 920. The processed signal is sent from signal processor 920 to an object identification manager 940 to obtain the RFID tag code 984. The signal is also provided to separation manager 960 to determine if the distance between the RFID monitor 900 and the RFID tag 980 exceeds a preset separation distance.

If the preset separation distance is not exceeded, the separation manager 960 sends "present" signal to RFID status report generator 990 indicative of the proximity of RFID tag 980 to the receiving device being monitored. RFID status report generator 990 will send a status report to the status file (see FIG. 6, 850 or 855) of the receiving device being monitored reporting the proximity of RFID tag 980 with RFID tag code 984 in proximity to that receiving device.

If the preset separation distance is exceeded, the separation manager 960 will take no action. In this case, RFID status report generator 990 will not receive a "present" signal. If RFID report generator 990 has previously received a "present" signal relating to RFID tag 980, then RFID status report generator 990 will send a new RFID status to the appropriate status file removing RFID tag 980 with RFID code 984 from the list of RFID tags in proximity to the receiving device being monitored. In an embodiment of the present invention, RFID status report generator 990 waits a number of polling cycles in which the preset separation distance between RFID monitor 900 and RFID tag 980 is determined to have been exceed before removing RFID tag 980 from the list of RFID tags in proximity to the receiving device being monitored.

In one embodiment of the present invention, separation manager 960 determines that the preset separation distance has been exceeded based on a lack of a reflected signal from RFID tag 980.

In another embodiment, separation manager 960 uses the signal strength of the reflected signal to determine that the preset separation distance has been exceeded. In conjunction with the variable power of the query signal emitted by query manager 905 and the variable sensitivity of the signal acquisition element 910, the separation distance threshold may be adjusted. As will be appreciated by those skilled in the art, that other means may be used to determine that the preset separation distance has been exceeded without departing from the scope of the present invention.

The monitoring system and method of the present invention also contributes to the changing environment of office "hoteling" wherein multiple workers, each of whom may telecommute, may use the same office when they are present at different times in the physical location of their organization. In this manner, a worker can check into the office to be used and, via the present invention, have calls routed to that office and have appropriate computer access to files based on the status of the receiving device in that office (i.e telephone, computer, fax machine, PDA, cell Phone). As a user's profile status changes, regardless of where the worker resides in a vacant or temporarily assigned office, the permissions for file access and telephone routing will be enabled and be appropriate to the permission level of that worker.

Figure 8:
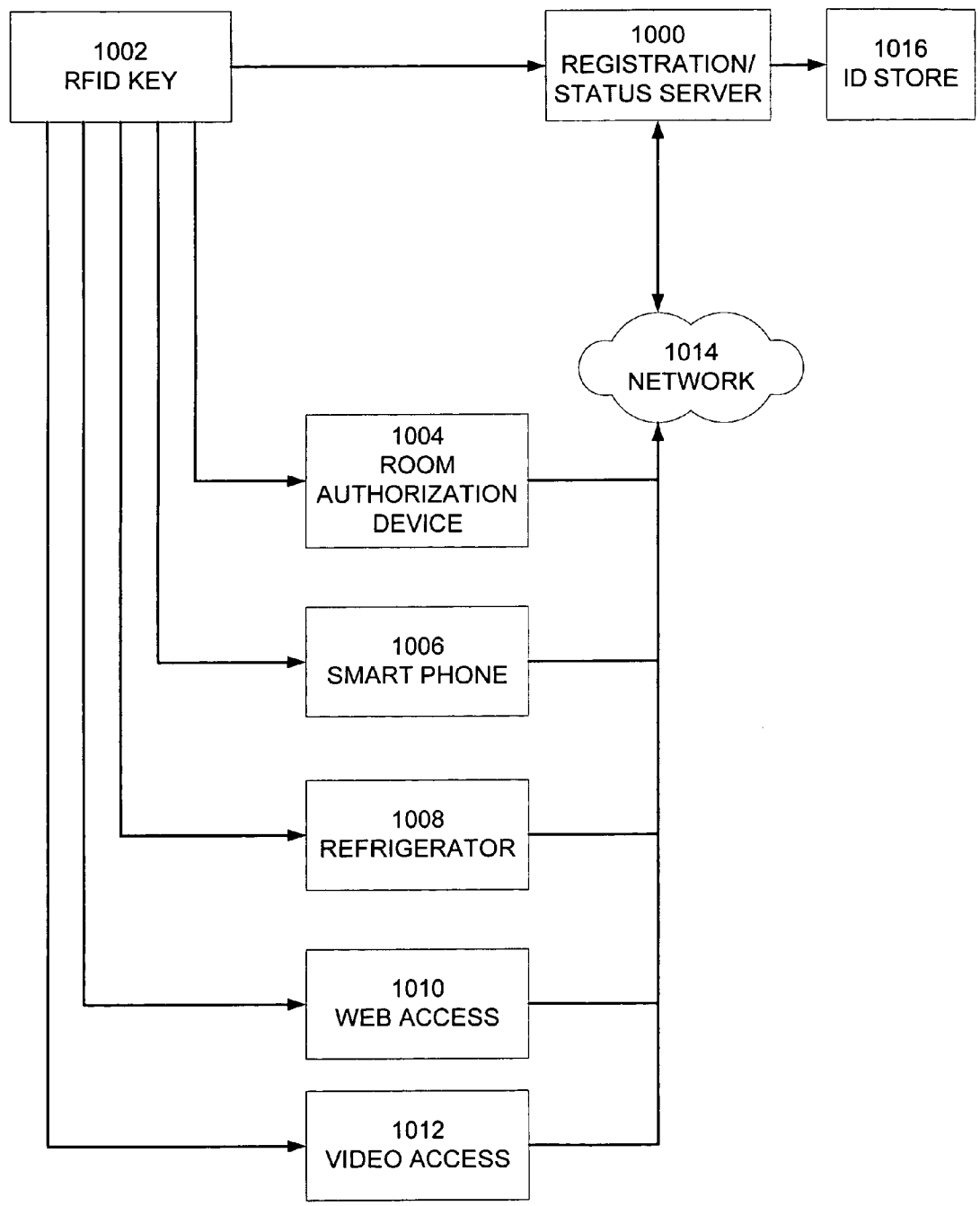
FIG. 8 illustrates a device status checking for a smart room.

Referring now to FIG. 8 an alternative embodiment of the status file checking of the present invention is illustrated in the context of a hotel environment. This description is not meant as a limitation since the status files checking and permissions as described below are equally applicable in a variety of settings. By way of illustration and not as a limitation, the description that follows may be applied to a hotel, a hospital, a cruise ship, a movie theater, an educational institution, an employment center, a detainment facility, a military facility, a police facility, a governmental office, and a research facility.

In this illustrative embodiment of FIG. 8 a guest is issued an RFID "key" 1002 upon check in. At that point registration information concerning the guest is stored via a registration/status server 1000 into an ID store 1016. Part of that information is the identity of the guest, the charge card/debit card being used and other information customary in the trade. However, in addition, the guest can specify what other services are desired such as refrigerator access, phone access, video access, internet access and other services that a hotel might offer on a "pay-as-you-go" basis. Any such service elections are also stored in the ID store 1016 along with the RFID Key 1002 identity. In this way, the guest receives permissions to use any number of controlled devices, for example and without limitation, a telephone, a refrigerator, an entertainment center, and a computing device.

Thereafter, the guest may be admitted to the room via use of the RFID Key 1002 and the room authorization device 1004 such as, and without limitation, and RFID activated door lock. When the guest desires to use the smart telephone 1006, the RFID key 1002 is simply brought into proximity of the telephone, which comprises an authorization device having RFID checking capability (not illustrated) and a signal is sent via network 1014 to registration/status server 1000. Registration/status server 1000 checks the ID store 1016 to determine if smart telephone use permission has been granted. If so, the smart telephone 1006 is immediately available for use by the guest. In this instance different levels of access may be granted to a specific key holder. For example, one key holder may have full access to controlled devices that provide local, long distance, international and a variety of other calling services. Another guest, for example a minor having his/her own key, may simply have access to a telephone to make limited local calls. Similarly, access to videos and other entertainment media having different ratings can be controlled based on the RFID key 1002 issued to a guest.

If the guest desires access to the in-room refrigerator 1008, that device also comprises an authorization device having RFID checking capability (not illustrated). The guest again use room key 1002 to obtain access to the refrigerator 1008. Access is then granted once the RFID key ID is checked over network 1014 via registration/status server 1000 and ID store 1016.

Access to the Internet 1010 and in room games and videos 1012 is also controlled based upon permission given to specific key holders. All key holders are separately identified in ID store 1016 in association with their respective permissions.

In an alternative embodiment, when a guest checks in and uses key 1002 to enter a room via room authorization device 1004, the registration/status server 1000 and ID store 1016 are notified that the room was access by the appropriate guest having a particular RFID key 1002. Thereafter, upon checking of the permissions for that guest stored in ID store 1016, signals are sent to the various in-room controlled devices (smart phone 1006, refrigerator 1008, web access 1010, and video access 1012) that the guest requested permission to access on check in. When the guest leaves the room, and when the RFID comes in the vicinity of the room authorization device 1004, all in-room facility access is turned off until that guest returns.

Using the present invention, other keys may be issued to other staff personnel depending on the level of access desired. For example, the maid service may require access but are not permitted access to internet, telephone refrigerator or other services. However, upon entering a room, the registration/status server 1000 is sent a message that a certain key holder (staff member) is present in the room. With that information, management can contact the staff worker via the smart phone 1006 should the need arise. However, the staff member would not necessarily have access to other in-room facilities. Any such access would be denied by the registration/status server 1000.

In still another embodiment of the present invention, when a caller desires to reach a guest, the operator in the hotel can access the status file of the telephone in the guest's room to determine if the guest is present or on the line. The caller can then either be informed of that device status or be put through to the room if the guest is present on not on the telephone.

It should be noted that, while a single network 1014 is noted in FIG. 8, this is not meant as a limitation. Access signals and permissions may be transmitted to the registration/status server 1000 over multiple networks such as wired and wireless networks, depending upon the configuration of the communication system in the hotel (or other facility). In addition, other signals relating to the status of in-room facilities are also available over the network of the present invention. Such things as refrigerator temperature may be sent independent of any access request in order to track where the refrigerator 1008 is operating. The status of the internet access device (router, hub etc) can also be verified while the guest is away via signal over the network. Similarly the set top box, cable modem, may be checked over the network to ensure all is in working order.

This illustration is not meant as a limitation. For example, status checking using RFID storage and access of the present invention can equally be used in a factory settling where access and status of devices and personnel must be controlled. Hospitals will also benefit from the status checking of the present invention as well. Many other facilities such as schools, movie theaters, research laboratories, military and police facility, and correctional institutions will also find utility in the present invention where status of devices, and identification of users is desired in order to regulate access to controlled devices and spaces.

For example, in a movie theater embodiment, movie theatre tickets comprise an RFID tag. Permissions are associated with specific tags so that a "PG" movie will have and RFID tag identifying the ticket as one that admits a person only to that level of movie. Attempts to by a ticket holder to enter a movie with a more restrictive rating will be thwarted by alarm, door entry restrictions and the like. Similarly, a ticket for an "R" rated movie will have an appropriate RFID tag ticket that will allow entry to that movie. The RFID tag tickets of the present invention also allow attendance figures to be taken, allow specific movie times of attendance to be policed and allow other functions relating to movie attendance (concessions, leaving early etc.) to be tracked.

The present invention has been described in terms of preferred embodiments. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A system, comprising:
   an authorization device configured to transmit a first signal to a status server in response to a first occurrence of a user device being within a configurable access distance of the authorization device, and transmit a second signal to the status server in response to a second and subsequent occurrence of the user device being within the configurable access distance of the authorization device, wherein each of the first signal and the second signal includes an identifier associated with the user device; and
   wherein the status server is configured to access a status file, in response to receipt of the first signal, to determine, based on the identifier, whether one or more usage of one or more controlled devices are permitted, and allow use of the one or more controlled devices in response to a determination that the one or more usage of the one or more controlled devices are permitted, and wherein the status server is further configured to deny use of the one or more controlled devices in response to receipt, subsequent to the receipt of the first signal, of the second signal that includes same identifier that is included in the first signal,
   wherein the user device is assigned a level of access to the one or more controlled devices, wherein the level of access includes permission by the authorization device to access a first of the controlled devices and denial of permission by the authorization device to access a second of the controlled devices,
   wherein in response to detection of permitted presence of the user device in a location of the one or more controlled devices and if a user of the user device is to be contacted, the second controlled device is enabled to permit the user of the user device to be contacted via the second controlled device while usage of controlled devices other than the first and second controlled devices remain denied, and
   wherein the status server is further configured to determine whether the first controlled device is currently in use by the user.

2. The system of claim 1, wherein the one or more controlled devices include a telephone, a refrigerator, an entertainment system, or a computing device.

3. The system of claim 1, wherein the authorization device is configured to transmit the first signal and the second signal over a network, wherein the network is selected from a group consisting of a wired network, a wireless network, a fiber network, hybrid fiber coax network, a switched network, a packet-based network, a cable network, a public switched telephone network, and the Internet.

4. The system of claim 1, wherein one of the one or more controlled devices includes a telephone and the status file includes a permission to make a long distance call, an international call, or a local call.

5. The system of claim 1, wherein the identifier includes a radio-frequency identifier (RFID) tag identifier and the user device includes an RFID tag, and wherein the authorization device comprises an RFID monitor configured to:
   detect a presence of the RFID tag within the configurable access distance; and
   acquire the RFID tag identifier from the RFID tag.

6. The system of claim 1, wherein the authorization device comprises a room authorization device associated with a room and the one or more controlled devices are situated within the room.

7. The system of claim 1, wherein the status server is further configured to route one or more messages to the one or more controlled devices, wherein the one or more messages are directed to the user of the one or more controlled devices.

8. A method, comprising:
   receiving, by a registration server, a first signal that includes an identifier of a user device, wherein the first signal is received in response to a first occurrence of the user device being within a configurable access distance of an authorization device;
   accessing, by the registration server based on the receiving the first signal, a status file to determine, based on the identifier, whether one or more usage of one or more controlled devices are permitted;

transmitting, by the registration server, an access signal to the one or more controlled devices to allow usage of the one or more controlled devices in response to a determination that the one or more usage of the one or more controlled devices are permitted;

determining, by the registration server, whether the one or more controlled devices is currently in use by a user of the user device;

receiving, by the registration server subsequent to the receiving the first signal, a second signal that includes the identifier of the user device, wherein the second signal is received in response to a second occurrence, subsequent to the first occurrence, of the user device being within the configurable access distance of the authorization device;

transmitting, by the registration server, a denial signal to the one or more controlled devices to deny usage of the one or more controlled devices based on the received second signal; and in response to detection of permitted presence of the user device in a location of the one or more controlled devices and if the user of the user device is to be contacted, wherein the user device is assigned a level of access to the one or more controlled devices that includes permission by the authorization device to access a first of the controlled devices and denial of permission by the authorization device to access a second of the controlled devices, enabling the second controlled device to permit the user of the user device to be contacted via the second controlled device while usage of controlled devices other than the first and second controlled devices remain denied; and routing, by the registration server, one or more messages to the enabled second controlled device.

9. The method of claim 8, wherein the accessing the status file comprises accessing the status file to determine one or more permissions to use a telephone, a refrigerator, an entertainment system, or a computing device.

10. The method of claim 8, wherein the transmitting the access signal and the denial signal comprises transmitting the access signal and the denial signal over a network selected from the group consisting of: a wired network, a wireless network, a fiber network, hybrid fiber coax network, a switched network, a packet-based network, a cable network, a public switched telephone network, and the Internet.

11. The method of claim 8, wherein the transmitting the access signal comprises transmitting an access signal to a telephone that allows usage of the telephone to make a local call, a long-distance call, or an international call.

12. The method of claim 8, further comprising:
storing, by the registration server, the identifier in an authorization device status file, wherein the authorization device status file is associated with a room.

* * * * *

UNITED STATES PATENT AND TRADEMARK OFFICE
CERTIFICATE OF CORRECTION

PATENT NO. : 8,464,359 B2  Page 1 of 1
APPLICATION NO. : 11/280506
DATED : June 11, 2013
INVENTOR(S) : Light et al.

It is certified that error appears in the above-identified patent and that said Letters Patent is hereby corrected as shown below:

In the Specification

Column 3, Line 51, delete "the the" and insert -- the --, therefor.

Column 6, Line 31, delete "condition" and insert -- condition. --, therefor.

Column 11, Line 24, delete "tem further" and insert -- further --, therefor.

Column 21, Line 33, delete "to by" and insert -- to/by --, therefor.

Signed and Sealed this
Thirteenth Day of May, 2014

Michelle K. Lee
*Deputy Director of the United States Patent and Trademark Office*